July 1, 1941.   G. L. CAILLE ET AL   2,247,801
SIGNALING AND INTERLOCKING SYSTEM FOR TRAFFIC ROUTES
Filed July 26, 1939   10 Sheets-Sheet 1
*Fig. 1.*
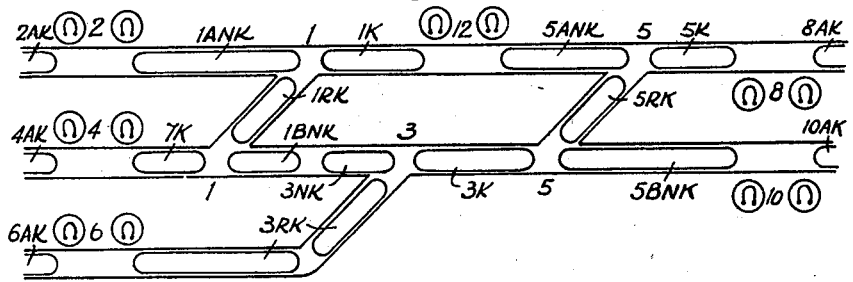
*Fig. 2.*
*Fig. 3*
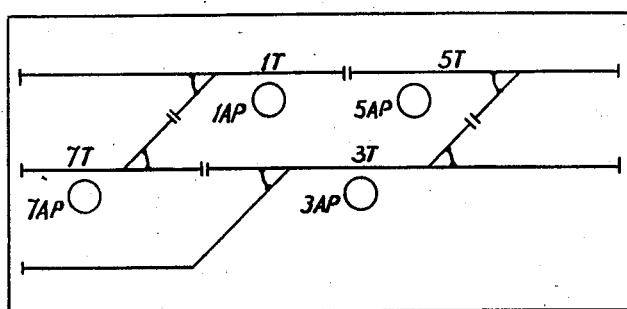
INVENTORS *Georges Louis Caille and Alexandre Pierre Laze.*
BY
THEIR ATTORNEY.

July 1, 1941.   G. L. CAILLE ET AL   2,247,801
SIGNALING AND INTERLOCKING SYSTEM FOR TRAFFIC ROUTES
Filed July 26, 1939   10 Sheets-Sheet 3

INVENTORS  *Georges Louis Caille and
Alexandre Pierre Laze*

BY
*THEIR ATTORNEY.*

July 1, 1941.　　　G. L. CAILLE ET AL　　　2,247,801
SIGNALING AND INTERLOCKING SYSTEM FOR TRAFFIC ROUTES
Filed July 26, 1939　　　10 Sheets-Sheet 4
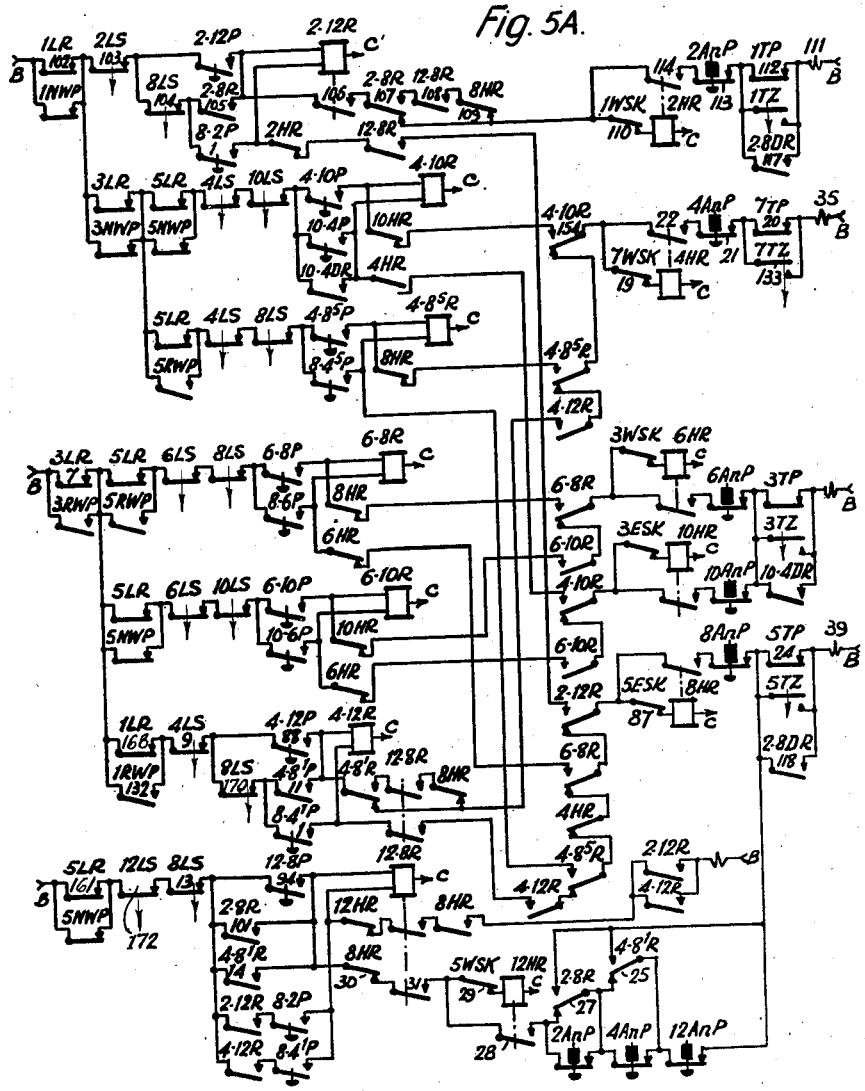
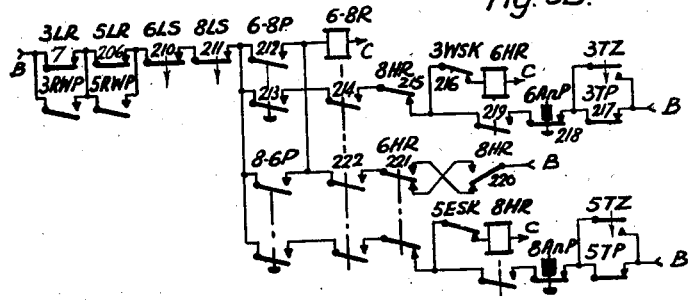
INVENTORS  *Georges Louis Caille and Alexandre Pierre Laze.*
BY *[signature]*
THEIR ATTORNEY.

Fig. 6.
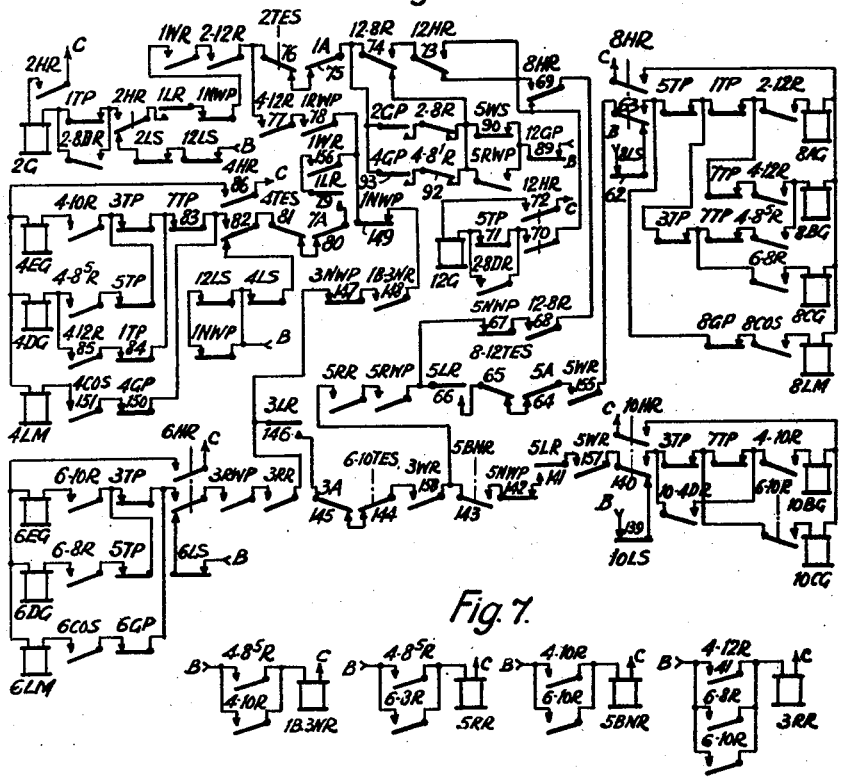
Fig. 7.
Fig. 8.
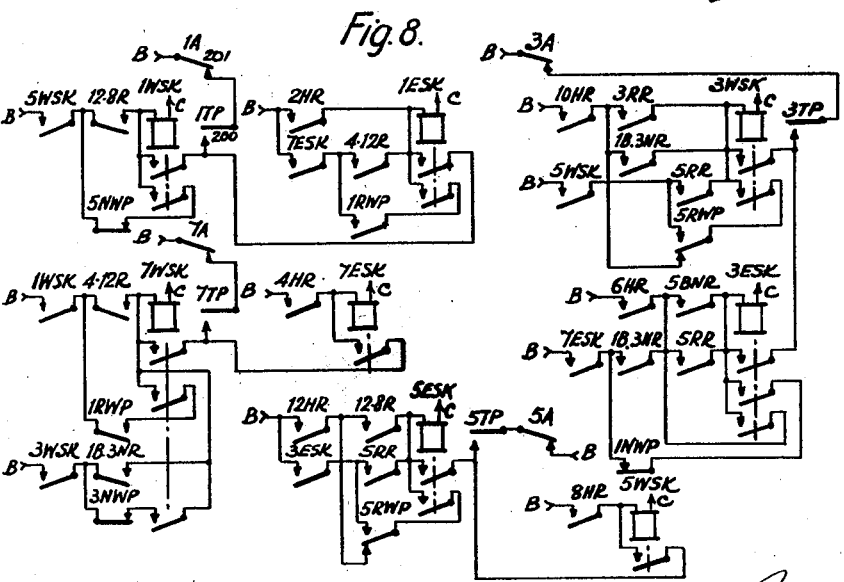
INVENTORS Georges Louis Caille and
Alexandre Pierre Laze.
BY
THEIR ATTORNEY.

INVENTORS. *Georges Louis Caille and*
*Alexandre Pierre Laze.*

BY
THEIR ATTORNEY.

July 1, 1941.    G. L. CAILLE ET AL    2,247,801
SIGNALING AND INTERLOCKING SYSTEM FOR TRAFFIC ROUTES
Filed July 26, 1939    10 Sheets-Sheet 7
Fig. 13.
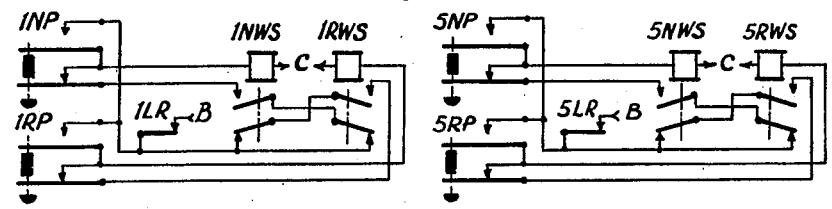
Fig. 14
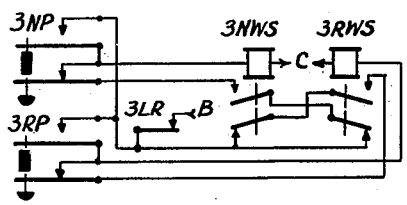
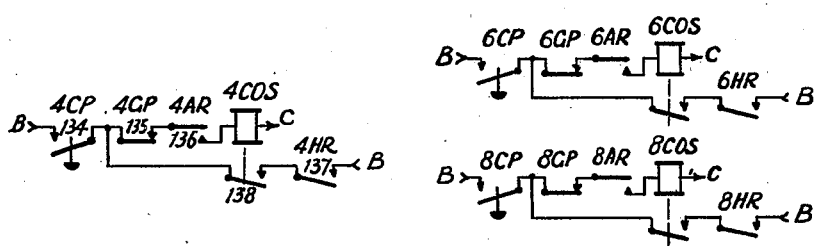
Fig. 15.
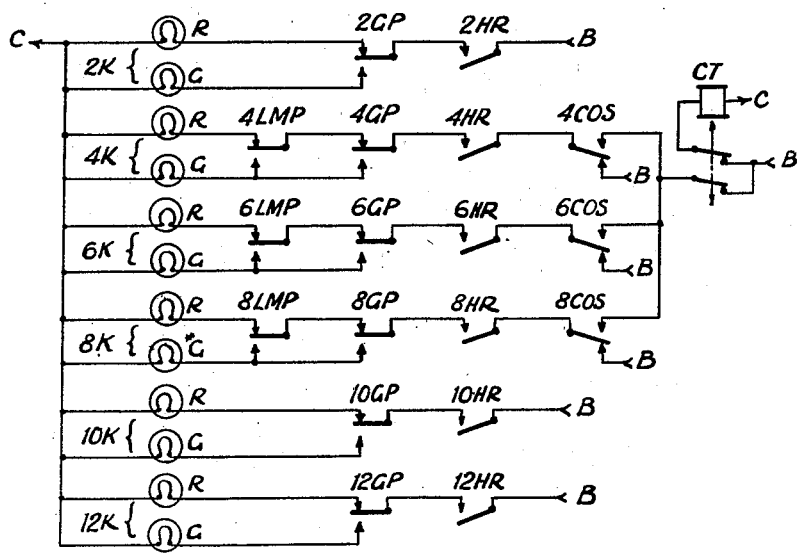
INVENTORS Georges Louis Caille and
Alexandre Pierre Laze.
BY
THEIR ATTORNEY.

INVENTORS Georges Louis Caille and
Alexandre Pierre Laze.

THEIR ATTORNEY.

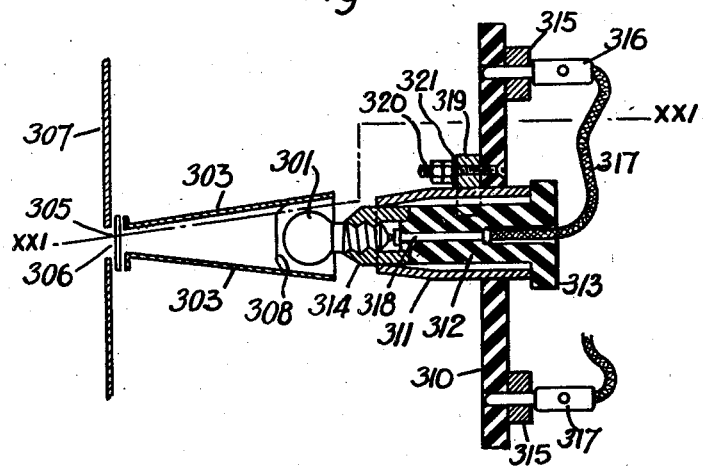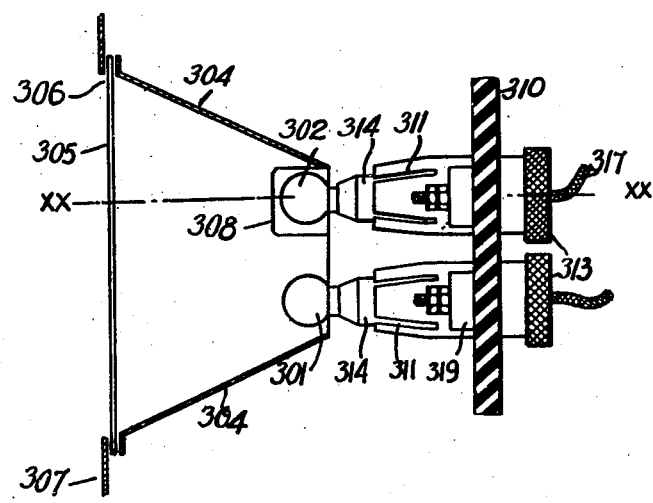

Patented July 1, 1941

2,247,801

UNITED STATES PATENT OFFICE 2,247,801

SIGNALING AND INTERLOCKING SYSTEM FOR TRAFFIC ROUTES

Georges Louis Caille, Vaujours, and Alexandre Pierre Laze, Paris, France, assignors, by mesne assignments, to The Union Switch & Signal Company, Swissvale, Pa., a corporation of Pennsylvania Application July 26, 1939, Serial No. 286,668 In France January 14, 1939

33 Claims. (Cl. 246—134)

A number of railway signaling and interlocking systems are already known, which are for the purpose of controlling traffic movements through a track layout comprising track sections interconnected by track switches adapted to be placed in different positions so as to form different traffic routes.

There is particularly one known arrangement which is characterized by the use of individual control members both for the entrance and for the exit end of each route considered. The present invention relates to apparatus of this character which, however, is distinguished from the previously known arrangement referred to by the following features:

The establishment of a route is effected by means of a single contact device (button, lever, or the like) and by means of a single operation. This route is automatically cancelled by the passage of a train through this route.

Certain of the routes which can be established by the apparatus can be rendered permanent if desired and are further arranged in such a manner as to remain established after the passage of a train through one of these permanent routes.

In the case of failure of a track circuit, switch locking may be temporarily cancelled so as to allow during this period the operation of the track switch in the defective section from the central control office.

The interlocking control system of our invention is further arranged to provide sectional route locking of an improved type, characterized by the locking of the track switches in front and the release at the rear of each train, even though the train passes the entering signal at stop.

The interlocking control system of our invention comprises, in addition to the usual track circuits and signals and associated control and indication relays, an operator's panel placed at a central office and provided with an assembly of route control devices combined with an illuminated track diagram constituting a miniature representation of the controlled tracks, the signals and track switches, as well as the other apparatus interlocked with the same and controlled from this office. The essential feature of the route control system consists in the use of a single route relay of the polar type or preferably of the type having two windings with a common return wire for each route, each of these windings corresponding to one of the two possible directions of traffic movement over the route, the direction of traffic movement being determined by a signal control relay. The provision of double winding route relays has the advantage that in the case of the common return wires being broken the two windings of the relay produce opposite fluxes, thereby preventing undesired operation in the case of a fault.

The arrangement adopted permits a simplification of the interlocking system owing to the provision of means for insuring that the preparation of a route can be initiated only when the entrance signal to this route is in its stop position. In order to simplify the diagrams, a track crossing without track switches has not been illustrated, but it is to be understood that this is equivalent to a track switch in respect to the interlocking required. Furthermore, the clearing of a signal is subject to the checking of the switch locking.

In view of these various objects and further objects which will appear as the detailed description proceeds, the invention thus consists in the arrangement as a whole and in the details of the electric circuits and apparatus, in the arrangement and operation of the control desk, and of the miniature track diagram combined therewith, and also in the various arrangements provided for obtaining the various features herein described.

Our invention is an improvement upon that disclosed in the French Patent No. 829,857, of November 24, 1937, which corresponds to the United States application Serial No. 118,609, filed December 31, 1936, by John M. Pelikan, for Railway traffic controlling apparatus.

In order that the invention should be readily understood, one embodiment thereof will now be described with certain modifications, as illustrated in the accompanying drawings in which Figs. 1 to 21, inclusive, taken together, illustrate diagrammatically the circuits and apparatus for a route interlocking system embodying one form of our invention, while Figs. 5A and 5B illustrate modifications. More particularly, Fig. 1 is a schematic diagram of a system of tracks, track switches and signals, constituting a miniature representation of the track layout chosen to illustrate our invention, which diagram is placed in the control office to be controlled by the signaling and route interlocking systems according to the invention;

Fig. 2 shows schematically the front of the control desk with the various buttons P grouped and arranged according to a plan which will be specified hereinafter;

Fig. 3 shows likewise schematically the arrangement of the buttons AP for effecting the emergency release of the detector locking;

Figs. 5A and 5B show two alternative forms of the route circuit network, either of which may be used in place of that of Fig. 5 in the system of Figs. 1 to 21, inclusive;

Fig. 6 shows the signal circuit network comprising the circuits for the signal relays G and for the call-on signals M;

Fig. 7 shows the circuits for certain auxiliary route relays NR and RR;

Fig. 8 shows the circuits for a group of directionally controlled indication relays ESK and WSK for controlling the lighting of the track diagram;

Fig. 13 shows apparatus for operating the track switches individually, comprising the normal and reverse switch stick relays NWS and RWS controlled by the buttons NP and RP of Fig. 2;

Fig. 14 shows the circuits for the call-on stick relays COS controlled by the buttons CP of Fig. 2;

Fig. 15 shows the circuits for the red and green signal indication lamps which are placed at the corresponding signal locations in Fig. 1;

Figs. 20 and 21 show a vertical and horizontal section respectively of a particularly advantageous arrangement of the elements of the illuminated track diagram of Fig. 1, permitting a reduction in the space required by these elements and facilitating the replacement of the lamps thereof.

Similar reference characters refer to similar parts in each of the several views.

According to the current practice in signaling systems, the track switches are identified by odd numbers 1, 3, 5, whereas the track signals are identified by even numbers such as 2, 4, 6, 8, the corresponding numbers being repeated on the operator's panel of Fig. 2 and on the track diagram of Fig. 1. The two switches of a crossover have the same numbers, and are differentiated by suffixes A and B, and the same is the case in respect to multiple-light or multiple-arm signals.

In this connection it should be noticed that the diagrams, (see Fig. 4) indicate multiple-light signals but it is obvious that multiple-arm signals performing the same functions could also be employed.

In the various circuit diagrams each relay is identified by a letter or a combination of letters preceded by the designation of the track switch or the signal with which this relay is associated.

The numbers identifying the switches and signals are also employed to identify the push buttons and route relays associated with particular routes; for example, the designation 4—8¹P indicates that the button bearing this designation governs the route from signal 4 to signal 8 via the crossover switches 1B and 1A reversed, while the designation 4—8⁵R indicates that the route relay bearing this designation is associated with route 4—8 via 5 reversed.

Figure 4:
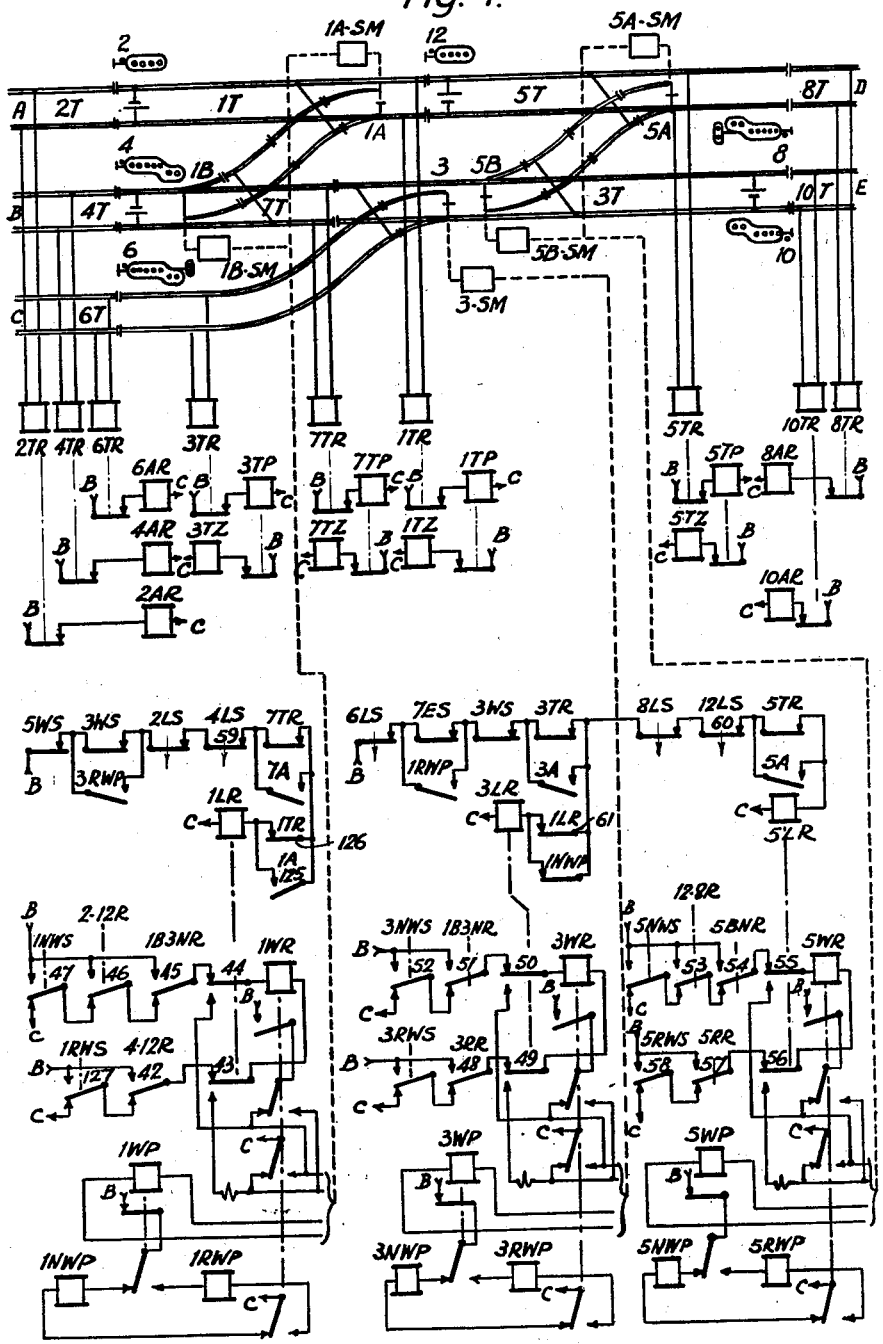
Fig. 4 shows in its upper portion, a track plan illustrating the arrangement of the tracks of the layout to be controlled, together with the circuits for the track relays TR and repeating relays controlled thereby, and in its lower portion, the circuits for the switch control relays WR, the switch indication relays WP and the switch locking relays LR.

Furthermore, in order to facilitate the identification of the direction of traffic movements and of the routes governed by particular signals, the destinations of all the routes of Fig. 4 have been respectively designated by A, B, C, and D, E, these characteristic letters being then utilized in the diagrams for distinguishing the signal relays, such, for example, as the relay 4EG for the route extending from signal 4 to the point E.

In order to facilitate the reading of circuits, the same are dealt with in the description with similar circuits grouped in the same figure. In the circuits as shown the relay contacts are not necessarily adjacent the relay by which they are controlled, and a contact is identified not only by a reference character comprising a number, but more particularly by mentioning the relay by which it is controlled. Furthermore, instead of illustrating the local source of current from which the relays are energized, only the supply wires indicated by the references B and C have been illustrated, which respectively correspond to the positive or supply wire and to the negative or common return wire of the source.

Figure 16:
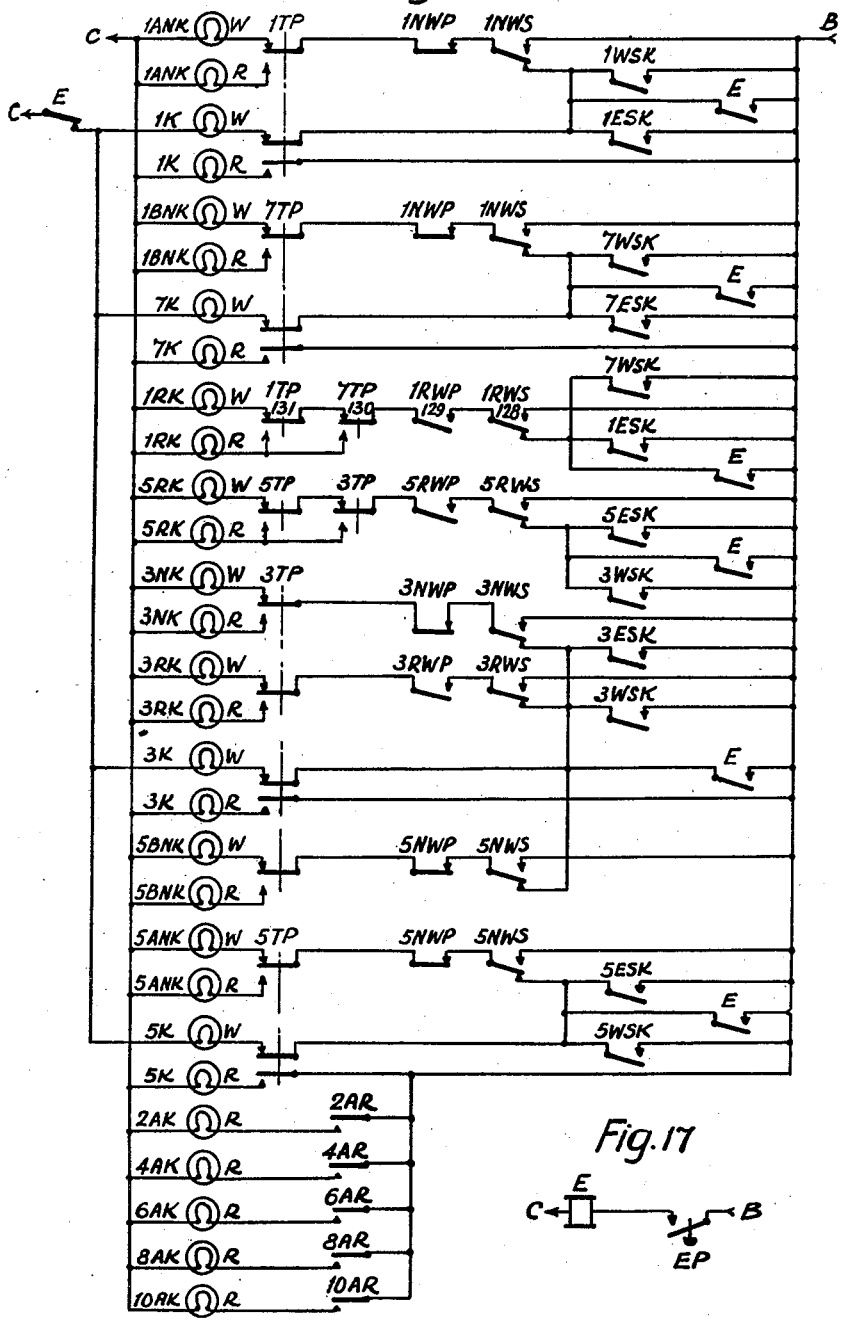
Fig. 16 shows the circuits for the red and white lamps for illuminating the track portions of Fig. 1.
Figure 17:
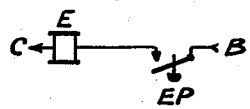
Fig. 17 shows the circuit for a relay E, by means of which the switch indication lamps of Fig. 16 may be lighted checking the position of the track switches.

As shown in Figs. 1, 2 and 3, the operator's panel proper comprises an illuminated track diagram (Fig. 1), a control desk (Fig. 2) and an auxiliary panel (Fig. 3). The miniature track diagram of Fig. 1 comprises translucent sections representing the various track sections interconnected by the track switches, which can be selectively illuminated by lamps placed at the back of the panel (Figs. 20 and 21), the lamps being energized in accordance with the position of the contacts of the relays which control them (Figs. 15 and 16).

Owing to the arrangements used, the control desk of Fig. 2 may be made in very small dimensions and consequently may be disposed in the most suitable manner relative to the track diagram or may be arranged to form a single unit together with the latter.

As indicated in the figure, this desk comprises a certain number of vertical columns of buttons, above which a horizontal row is arranged. The route buttons are located in the vertical columns below the word "Exit," the route buttons in each column being those associated with routes having the same entrance. Each route button bears a number, such as 2, 4, 6, 8, 10, etc. According to the principal feature of the invention there is only a single button for each route and the number carried by the button corresponds to the destination of this route. For preparing a route it is only necessary for the signalman to press the corresponding button without having to effect any further operation. The simplification of the control is still increased owing to the fact that the buttons for the various routes having the same entrance are grouped in vertical columns. It will thus be seen that the buttons 2—8P and 2—12P, for example, marked 8 and 12 and located in the first vertical column (entrance 2) govern routes 2—8 and 2—12, respectively.

Each vertical column includes further a route cancelling "pull" button 2A*np*, 4A*np* . . . 10A*np*. The desk further comprises a set of call-on press buttons 4CP, 6CP, 8CP, these buttons being provided for each entrance at which the associated signal is provided with a call-on light or arm.

Certain of the columns comprise "direct" route buttons such as 2—8DP, 10—4DP the operation of which will be described further below.

Finally, an emergency switch indication press button EP permits the switch indicating portions of the track diagram to be illuminated at will, the track diagram being normally dark and the portions corresponding to a route being illuminated automatically only when the route is set up or is occupied by a train. The provision of button EP allows the signalman to ascertain at any time the position of each of the track switches. The illumination is extinguished when this button is released. Finally, the upper row of buttons NP and RP permits when necessary the control of the track switches individually, particularly when a track circuit has become defective.

It should be noted in connection therewith that the individual control of the track switches is effected in a manner which is already known and described in the French patent hereinbefore referred to, and accordingly it will not be described in detail.

The various functions stated hereinafter, namely:
 Preparation of a route,
 Cancelling of a route,
 Call-on operation,
Establishment of a direct or permanent route, are hereinafter described individually and in detail, first as regards their operation and the effects resulting therefrom and then as regards the circuits themselves.

The auxiliary panel schematically illustrated in Fig. 3, which is placed adjacent the control desk, and which, if necessary may be sealed, is provided for permitting the cancelling of the detector switch locking by the operation of section-cancelling press buttons 1AP . . . 5AP provided in a number equal to that of the track circuits. The operation of this panel is as follows:

When for any reason a track relay is not energized when its section is unoccupied, one or more associated track switches would be locked which would prevent the establishment of certain routes; with the present apparatus the signalman may press the cancelling button corresponding to the defective track section and then operate the switch or switches by an individual control device to the desired position, and then prepare the route in the usual manner.

In the event that the entrance signal does not go to "proceed" the operator may authorize the passage of the train over the route:

(*a*) By giving a direct or permanent route, if possible, the route circuits and signal circuits for these routes being independent of track circuit conditions;

(*b*) By displaying the call-on light or arm when it is provided, or by issuing a permit in the case where neither a permanent route signal nor a call-on signal is available.

The cancelling of the switch locking for a section is automatically nullified by the operation of the route button for a route which includes the section. The operation of the cancelling button AP will thus have to be repeated each time that the operation of a locked track switch is necessary.

The various operations which may be carried out with the apparatus described and illustrated in Figs. 1 to 3 will now be described in detail with reference to the detailed circuits of Figs. 4 to 19.

*Establishment of non-permanent route.*—Assuming that a route is to be established from 4 to 8 via 1 reversed, it is only necessary for the signalman to press the button 4—8¹P, which in Fig. 2 is marked "8¹" and is located in the column "Entrance 4", and thus to produce the following operations (see Fig. 5):

The route relay 4—8¹R (Fig. 5) is energized by a circuit comprising wire B, front contact 161 of relay 5LR, front contacts 162 of relay 2LS, front contact 163 of relay 4LS, front contact 164 of press button 4—8¹P, back contact 165 of relay 2—8R, winding of relay 4—8¹R and return wire C.

The energized relay 4—8¹R completes the pick-up circuit for relay 4—12R comprising wire B, front contact 7 of relay 3LR, front contact 168 of relay 1LR, front contact 9 of relay 4LS, front contact 170 of relay 8LS, front contact 11 of relay 4—8¹R, back contact 152 of relay 4—8⁵R, back contact 153 of relay 4—10R, winding of relay 4—12R, and return wire C. The energization of relay 4—8¹R completes the pick-up circuits for relays 12—8R and 12—HR. It will be noticed that the back contacts 152 and 153 of the relays 4—8⁵R and 4—10R are provided for the purpose of obtaining an interlocking of the routes starting from the same entrance.

The relay 12—8R is energized through a circuit including wire B, front contact 161 of relay 5LR, front contact 172 of the relay 12LS, front contact 13 of relay 8LS, front contact 14 of relay 4—8¹R, winding of relay 12—8R and return wire C. In its energized condition the relay 12—8R completes the pick-up circuit of relay 4HR including wire B, front contact 7 of relay 3LR, front contact 169 of relay 1LR, front contact 9 of relay 4LS, front contact 170 of relay 8LS, front contact 11 of relay 4—8¹R, front contact 15 of relay 4—12R, front contact 16 of relay 4—8¹R, front contact 17 of relay 12—8R, back contact 18 of relay 8HR, back contact 19 of relay 7WSK, winding of relay 4HR and return wire C. The energization of this relay 4HR interrupts at its contact 36 (Fig. 9) the circuit of the relay 4LS; this relay having strongly delayed release characteristics permits before dropping with ample allowance the operation of the switch control relays 1WR and 3WR which will be described further below. It will also be noticed that the dropping of the relay LS ensures the transfer of the route relays, for example 4—8¹R, and relays HR, for example, 4HR, to their stick circuits.

The relay 4HR is maintained energized through the following circuit: Wire B, fixed resistance 35, front contact 20 of relay 7TP, front contact 21 of the "pull" button 4A*np*, front contact 22 of relay 4HR, back contact 19 of 7WSK, winding of the relay 4HR and return wire C. The relay 4HR in its energized condition completes the holding circuit of relay 4—8¹R including wire B, fixed resistance 37, front contact 23 of relay 4HR, front contact 166 of relay 4—8¹R, back contact 165 of relay 2—8R, winding of relay 4—8¹R and return wire C. The energization of the relay 4HR completes the pick-up circuit of relay 7ESK which in turn energizes relay 1ESK (Fig. 8) as in the French patent already referred to, and produces the illumination of the corresponding portion of the track diagram. The energization of relay 4HR completes the holding circuit for relay 4—12R (Fig. 5) including wire B, fixed resistance 35, front contact 20 of relay 7TP, front contact 21 of button 4Anp, front contact 22 of relay 4HR, back contact 18 of relay 8HR, front contact 17 of relay 12—8R, front contact 16 of relay 4—8¹R, front contact 15 of relay 4—12R, front contact 152 of relay 4—8⁵R, back contact 153 of relay 4—16R, winding of relay 4—12R and return wire C. The energization of relay 4—12R completes the circuit for energization of relay 3RR (Fig. 7), including wire B, front contact 41 of relay 4—12R, winding of relay 3RR and return wire C.

The relay 12HR is energized through the following circuit (Fig. 5): Wire B, front contact 161 of relay 5LR, front contact 172 of relay 12LS, front contact 13 of relay 8LS, front contact 14 of relay 4—8¹R, back contact 30 of relay 8HR, front contact 31 of relay 12—8R, back contact 29 of relay 5WSK, winding of relay 12HR and return wire C. The energization of relay 12HR interrupts at back contact 36 (Fig. 9) the circuit of relay 12LS which has substantially delayed release characteristics, and thus permits with a large allowance the operation of the switch control relay 5WR which will likewise be described further below.

The relay 12HR is held by the following circuit (Fig. 5): Wire B, fixed resistance 39, front contact 24 of relay 5TP, front contact 25 of relay 4—8¹R, front contact 40 of button 4Anp, back contact 27 of relay 2—8R, front contact 28 of relay 12HR, back contact 29 of relay 5WSK, winding of relay 12HR and return wire C. When energized the relay 12HR completes the pick-up circuit of a relay 5ESK which produces illumination of the corresponding section of the track diagram as shown in Figs. 8 and 16, in a manner similar to that already described in the French patent referred to previously. Further, the relay 12HR completes in its energized position the holding circuit of relay 12—8R (Fig. 5) including wire B, fixed resistance 39, front contact 24 of relay 5TP, front contact 25 of relay 4—8¹R, front contact 40 of button 4Anp, back contact 27 of 2—8R, front contact 28 of relay 12HR, front contact 31 of relay 12—8R, back contact 30 of relay 8HR, winding of relay 12—8R and return wire C.

*The operation of the track switches* to establish this route is effected in the following manner (see Fig. 4): Relay 1WR is energized in response to the energization of the relay 4—12R which established the following circuit: Wire B, front contact 42 of relay 4—12R, front contact 43 of relay 1LR, winding of relay 1WR, front contact 44 of relay 1LR, back contact 45 of relay 1B—3NR, back contact 46 of relay 2—12R, back contact 47 of relay 1NWS and return wire C. The relay 3WR is energized by a circuit including wire B, front contact 48 of relay 3RR, front contact 49 of relay 3LR, winding of relay 3WR, front contact 50 of relay 3LR, back contact 51 of relay 1B—3NR, back contact 52 of relay 3NWS and return wire C.

The relay 5WR is energized by a circuit including wire B, front contact 53 of relay 12—8R, back contact 54 of relay 5BNR, front contact 55 of relay 5LR, winding of relay 5WR, front contact 56 of relay 5LR, back contact 57 of relay 5RR, back contact 58 of relay 5RWS, and return wire C.

The operation of the switch indication relays and the arrangements for controlling the signals by these relays are identical with those described in the French patent mentioned before (see Fig. 4). After operation of the track switches, the relays 1RWP, 3RWP and 5NWP are energized and illuminate the corresponding portions of the track diagram as in the patent above mentioned (Fig. 16).

*The locking of the track switches* is obtained in the following manner (see Fig. 4). The relays 4LS and 12LS, which have strongly delayed release characteristics in order to allow the operation of the switches to be initiated, now release and interrupt the circuits for relays 1LR and 5LR at the front contacts 59 and 60. When the relay 1LR drops, it interrupts the circuit of 3LR at the front contact 61.

The relays 1WR, 3WR and 5WR are then still maintained energized as in the above mentioned patent by back contacts 43 and 44 of relay 1LR, contacts 49 and 50 of relay 3LR, contacts 55 and 56 of relay 5LR. The switches 1, 3 and 5 are thus locked while the signals 4 and 12 are still at "stop."

It will be noticed that switch 3 which is not included in the route from 4 to 8 via 1 reversed has been controlled to reverse position so as to protect this route in case the signal 10 has been passed without authorization.

It will also be noticed that the voltage of the relays provided with holding circuits such as:
1WR, 3WR, 5WR, (Fig. 4);
4—12R, 12—8R, 4—8¹R, (Fig. 5) is very much higher than normal voltage in order to allow them to be very rapidly energized and then when the holding circuits are established, the voltages are reduced to their normal value owing to the interposition of a suitable resistance in the circuit.

*Clearing of the signals 4 and 12.*—Relay 12G (Fig. 6) is energized through the following circuit:

Wire B, front contact 62 of relay 8LS, back contact 63 of relay 8HR, front contact 155 of relay 5WR, back contact 64 of relay 5A, back contact 65 of relay 8—12TES, back contact 66 of relay 5LR, front contact 67 of relay 5NWP, front contact 68 of relay 12—8R, back contact 69 of relay 8HR, front contact 70 of relay 12HR, front contact 71 of relay 5TP, winding of relay 12G, front contact 72 of relay 12HR and return wire C. Relay 4DG is energized over a circuit which is the same as that for relay 12G from terminal B to back contact 69 of relay 8HR, and extends from contact 69 over front contact 73 of relay 12HR, front contact 74 of relay 12—8R, back contact 75 of relay 1A, back contact 76 of relay 2TES, front contact 77 of relay 4—12R, front contact 78 of relay 1RWP, front contact 156 of relay 1WR, back contact 79 of relay 1LR, back contact 80 of relay 7A, back contact 81 of relay 4TES, front contact 82 of relay 4HR, front contact 83 of relay 7TP, front contact 84 of relay 1TP, front contact 85 of relay 4—12R, winding of relay 4DG, front contact 86 of relay 4HR, and return wire C.

*Lighting of the signal lamps and of the corresponding indication lamps in the track diagram.*—The illumination of the lamps of the signals 4 and 12 to display clear indications and the display of corresponding indications by the lamps of indicators 4K and 12K on the control panel, as a result of the release of relays 4GP and 12GP, (Figs. 18 and 19) the circuits for which are interrupted by the energization of the relays 4DG and 12G, is obtained (see Fig. 15) in a manner corresponding to that described in the French patent referred to. It will be noticed that the block relays for providing caution or distant indications of the signals have not been illustrated in order to simplify the description and the diagrams, the operation of these relays being the usual operation of such relays as ordinarily utilized in block signalling systems.

*Manual cancelling of the route from 4 to 8 via 1 reversed (Fig. 5).*—It may be assumed that no train is in the approach locking zone of signal 4. By operating the button 4A*np* the signalman interrupts the holding circuits for relays 4—12R, 4HR, 12—8R, 12HR, which drop. In dropping, relay 4HR interrupts at its front contact 23 the holding circuit of the relay 4—8¹R, which drops.

The dropping of these relays causes relays 4DG and 12G to drop which control the putting to "danger" of the signals 4 and 12; at the same time the circuits for the signal indicators 4K and 12K are opened and the relay 4—12R interrupts in dropping the circuit of relay 3RR, which drops likewise. It will be noted that the direction relays (Fig. 8) 7ESK, 5ESK, 1ESK are likewise dropped and that accordingly the track diagram ceases to be illuminated. The relays 4HR and 12HR which have dropped, have reenergized the relays 4LS and 12LS (Fig. 9) which, on their part, reenergize the relays 5LR and 1LR, the latter reenergizing 3LR.

The track switches 1, 3 and 5 are then unlocked but remain in the position assumed, and the signalman may prepare a new route.

In the following the succession of operations during the passage of a train or the like after clearing the signals 4 and 12 will be described in the case of the route considered above, that is to say from 4 to 8 via 1 reversed. It is evident that although the possibilities of cancelling this route have been described, this cancelling has not taken place in the case which will now be considered.

When the train enters the approach section 4T, relay 4TR is released and in dropping causes relay 4AR to drop and the approach section 4AK of the track diagram becomes illuminated in red (Fig. 16).

When the train enters the first section 7T of the route relay 7TR is released and in dropping causes relay 7TP to drop, then, with some delay, relay 7TZ; relay 7TP interrupts at its front contact 83 (Fig. 6) the energizing circuit of relay 4DG which drops and causes the signal 4 to change to its "stop" or "danger" indication. It will be noticed that the train caused relay 4DG to drop, which caused signal 4 to go to "danger" but independently of this going to "danger" the circuit of relay 4HR has been interrupted, the relay 7TZ having slow-release characteristics, thus causing relays 4—12R and 4HR to drop, which interrupt their stick circuits and cancel the route automatically. Relay 7TR interrupts the holding circuit of the relays 4—12R and 4HR, (Fig. 5) with the same succession in the operation of the relays as that described previously for the manual cancellation, and the track diagram is dealt with in the same manner as in the patent referred to. When the train enters section 1T, the relay 1TR drops, releasing relay 1TP, which in turn releases relay 1TZ with a delay. Relay 1TP opens contact 84 in the circuit of the relay 4DG (Fig. 6) to hold that circuit open, the track diagram being governed as in the case of the patent referred to. The relay 5TR drops in its turn, causing relays 5TP and 5TZ to release; the relay 5TP interrupts the energizing circuit of relay 12G (Fig. 6) at contact 71, and it also interrupts the holding circuit of the relays 12HR and 12—8R (Fig. 5) as previously indicated in the case of manual cancelling. According as the sections are successively vacated, the operation is the same as in the patent referred to. The direction-responsive relays 7ESK, 5ESK and 1ESK remain energized until their associated track sections are respectively vacated, to maintain the illumination of the corresponding portions of the track diagram.

A feature of our invention in the provision of means for checking that an established route is fully vacated before the opposed signal is allowed to be cleared. This is accomplished by including a back contact of the last direction-responsive relay ESK or WSK for the route, in the circuit for the signal control relay HR for the opposing signal.

For example, in the case of the route from 4 to 8 relay 8HR cannot be energized for clearing the opposing signal 8 until the back contact 87 of relay 5ESK (Fig. 5) is closed and this only takes place when a train or the like has vacated section 5T (at least when there is no manual cancellation).

Another feature of our invention is the provision of means for locking the switches in advance of a train in case a signal has been passed without authorization, no route having been set up. In this case the switches are locked by the relays 3WS, 5WS, 7ES (Fig. 10), which control the relays LR as in the patent referred to.

Figure 10:
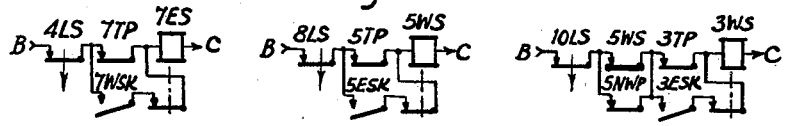
Fig. 10 shows the circuits for the section locking relays ES and WS, for effecting the sectional release of the route locking.
Figure 11:
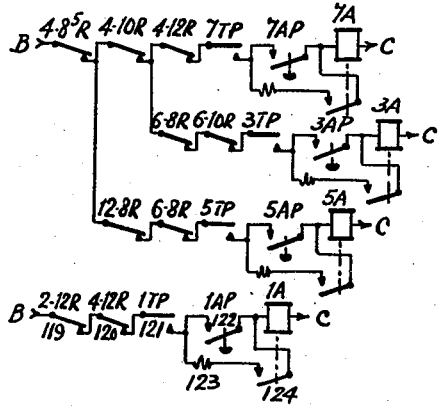
Fig. 11 shows the circuits for the emergency release relays A controlled by the buttons AP of Fig. 3.

Assuming that the switches have remained in their position assumed during the establishment of the route 4 to 8 via 1 reversed after this route has been cancelled and that a train passes the signal 8 when it is at "stop," the relay 5TP releases and interrupts the pick-up circuit of 5WS (Fig. 10). The holding circuit of this relay is not established, the relay 5ESK being in its released position because no direction of traffic is set up. In dropping, relay 5WS causes relay 1LR (Fig. 4) to release to lock switches 1, switch 3 is locked by relay 3LR which relay is released by relay 1LR; switches 5 have been locked by the dropping of relay 5LR the circuit for which has been interrupted by relay 5TR (Fig. 4).

The establishment of the route portion from 4 to 12 will now be described.

The signalman having pressed button 4—12P (Fig. 5), relay 4—12R is energized through a circuit including wire B, front contact 7 of relay 3LR, front contact 168 of relay 1LR, front contact 9 of relay 4LS, front contact 88 of press button 4—12P, back contact 152 of relay 4—8⁵R, back contact 153 of relay 4—10R, winding of relay 4—12R, and return wire C. The relay 4HR is energized over a circuit which is the same as that just described as far as and including the front contact 88 of press button 4—12P, and from contact 88 extends over front contact 15 of relay 4—12R, back contact 16 of relay 4—8¹R, back contact 19 of relay 7WSK, winding of relay 4HR and wire C. The holding circuits of the relays 4HR and 4—12R are the same as those described for the establishment of the route 4 to 8 via 1 reversed; the operation of the track diagram and of the relays 4LS, 1WR, 1LR, 3RR, 3WR, 3LR, 7ESK and 1ESK is likewise similar and need not therefore be described in detail.

In the present instance, the circuit closed after locking switches 1 and 3 to energize relay 4DG is slightly different from that previously described (Fig. 6). The circuit now to be described includes wire B, front contact 89 of relay 12GP, front contact 90 of relay 5WS, back contact 74 of relay 12—8R, and thence as previously described for the clearing of the signals 4 and 12, through relay 4DG to wire C.

It will be noticed that in order to avoid de-energization of relay 4DG during the transfer of its supply from the back contact to the front contact (contact 74 of relay 12—8R) upon the establishment of the route 12 to 8, a holding circuit, (Fig. 6) is established after energization of relay 4DG, which includes: supply wire B, front contact 89 of relay 12GP, front contact 90 of relay 5WS, back contact 92 of relay 4—8¹R, back contact 93 of relay 4GP, back contact 75 of relay 1A and then over the circuit as previously described for the clearing of signals 4 and 12 through relay 4DG to wire C.

The control of the signal lamps (Fig. 18) and the return indication of signal 4 is effected in a manner corresponding to that previously described; also the passage of a train or the like after clearing the signal 4 is effected under the same conditions as have been previously mentioned for the route "4 to 8 via 1 reversed."

The establishment of the route portion "12 to 8" will now be described.

The signalman having pressed button 12—8P, the relay 12—8R is energized through a circuit (Fig. 5) including supply wire B, front contact 161 of relay 5LR, front contact 172 of relay 12LS, front contact 13 of relay 8LS, front contact 91 of press button 12—8P, winding of relay 12—8R and return wire C. The circuit for relay 12—HR extends from wire B over the same path as that for relay 12—8R, as far as and including the front contact 91 of press button 12—8P then passing from contact 91 through back contact 30 of relay 8HR, front contact 31 of relay 12—8R, back contact 29 of relay 5WSK, winding of relay 12HR and return wire C.

The holding circuits of the relays 12HR and 12—8R are identical with those already described for these relays; the same is the case as regards the operation of the relays 12LS, 5WR, 5LR, 5ESK and also for the corresponding indications of the track diagram. It will be noticed that after locking the switches 5 (Fig. 6) the circuit for relay 12G is closed as already described for the clearing of the signals 4 and 12. The same is the case as retards the control of the signal lamps and of the return indication of signal 12, and the effect of the passage of a train or the like when signal 12 has been cleared. It will be observed that for establishing the through route from 4 to 8 comprising the two routes which are arranged end to end and extend from 4 to 12 and then from 12 to 8, respectively, it is sufficient to proceed with the operations by which these two route portions are established, that is, route 4—8 via 1 reversed may be established by operating button 4—8¹P alone, or by operating buttons 4—12P and 12—8P.

As previously mentioned, the apparatus according to the invention is arranged to insure the permanency of certain preferred routes, for example those which are most frequently used.

The term "permanent route" designates a direct route which when once established will remain established with successive passages of trains over the route. If a route of this type is to be established from 2 to 8, the signalman presses button 2—8DP of the entrance 2 (Fig. 2); the relay 2—8DR is then energized (Fig. 5) by a circuit including supply wire B, front contact 94 of press button 2—8DP, winding of relay 2—8DR and return wire C. The energization of relay 2—8DR completes the pick-up circuit of relay 2—8R, including supply wire B, front contact 161 of relay 5LR, front contact 162 of relay 2LS, front contact 163 of relay 4LS, front contact 97 of relay 2—8DR, back contact 98 of relay 4—8¹R, winding of relay 2—8R and return wire C. The energization of relay 2—8R completes the pick-up circuit of relays 2—12R and 2HR, the former including supply wire B, front contact 102 of relay 1LR, front contact 103 of relay 2LS, front contact 104 of relay 8LS, front contact 105 of relay 2—8R, winding of relay 2—12R and return wire C. The circuit of relay 2HR is the same as that of relay 2—12R from wire B as far as and including the front contact 105 of relay 2—8R, and then passes through front contact 106 of relay 2—12R, front contact 107 of relay 2—8R, front contact 108 of relay 12—8R, back contact 109 of relay 8HR, back contact 110 of relay 1WSK, winding of relay 2HR and return wire C.

The pick-up circuits for relays 12—8R and 12HR are also completed by the energization of relay 2—8R; the relay 12—8R is energized by a circuit including supply wire B, front contact 161 of relay 5—LR, front contact 172 of relay 12LS, front contact 13 of relay 8LS, front contact 101 of relay 2—8R, winding of relay 12—8R and return wire C. The relay 12HR is energized through the same circuit as relay 12—8R from wire B as far as and including the front contact 101 of relay 2—8R, the circuit for relay 12HR then passing through back contact 30 of relay 8HR, front contact 31 of relay 12—8R, back contact 29 of relay 5WSK, winding of relay 12HR, and return wire C.

The relay 2—8DR establishes its holding circuit (Fig. 5) including: supply wire B, fixed resistance 115, front contact 95 of relay 2HR, front contact 96 of relay 2—8DR, winding of relay 2—8DR and return wire C.

The relay 2—8R establishes its holding circuit including: supply wire B, fixed resistance 116, front contact 99 of relay 2HR, front contact 100 of relay 2—8R, back contact 98 of relay 4—8¹R, winding of relay 2—8R and return wire C.

The holding circuit of relay 2—12R is as follows: supply wire B, fixed resistance 111, front contact 112 of relay 1TP, front contact 113 of button 2Anp, front contact 114 of relay 2HR, back contact 109 of relay 8HR, front contact 108 of relay 12—8R, front contact 107 of relay 2—8R, front contact 106 of relay 2—12R, winding of relay 2—12R and return wire C. The holding circuit of relay 2HR is the same as that for relay 2—12R from wire B as far as and including front contact 114 of relay 2HR and passes then through back contact 110 of relay 1WSK, winding of relay 2HR and return wire C.

The relay 12—8R establishes its holding circuit as follows: supply wire B, fixed resistance 39, front contact 24 of relay 5TP, front contact 27 of relay 2—8R, front contact 26 of button 2Anp, front contact 28 of relay 12HR, front contact 31 of relay 12—8R, back contact 30 of relay 8HR, winding of relay 12—8R and return wire C.

The holding circuit of relay 12HR is identical with that of relay 12—8R from wire B as far as and including front contact 28 of relay 12HR and passes then through back contact 29 of relay 5WSK, winding of relay 12HR and return wire C.

The resulting operation is similar to that of the route previously established from 4 to 8 via 1 reversed considering the relays involved. It will be noted briefly: relay 2—12R in its energized condition completes the normal pick-up circuit of relay 1WR (Fig. 4). Relay 12—8R when energized completes the normal pick-up circuit of 5WR (Fig. 4). Then the relay 1WR and 5WR are held energized, the track switches are moved and return their indications, the normal indication relays 1NWP, 5NWP, (Fig. 4) being energized.

When relay 2HR is energized, it energizes relay 1ESK, (Fig. 8).

When relays 12HR and 12—8R are energized, they complete the pick-up circuit of relay 5ESK (Fig. 8).

The illumination of the track diagram is effected in the manner described in the French patent previously referred to.

When relay 2HR is energized it causes relay 2LS to drop which in turn interrupts the circuit of relay 1LR, thus locking switches 1.

When relay 12HR is energized it causes relay 12LS to drop which in turn interrupts the circuit of relay 5LR and locks switches 5.

The relays 2G and 12G controlling the clearing of the signals 2 and 12 are energized (Fig. 18); the signal indication relays 2GP and 12GP drop to cause the signal indications to be displayed on the track diagram as in the previously mentioned French patent.

During the passage of a train the signal will continue to display a proceed indication, the contacts of relays 1TP and 5TP in the circuits for relays 2G and 12G being bridged by the contacts of relay 2—8DR (Fig. 6).

All the relays involved with the exception of the track relays and track repeater relays will remain inactive in their position during the passage of the train.

Figure 5:
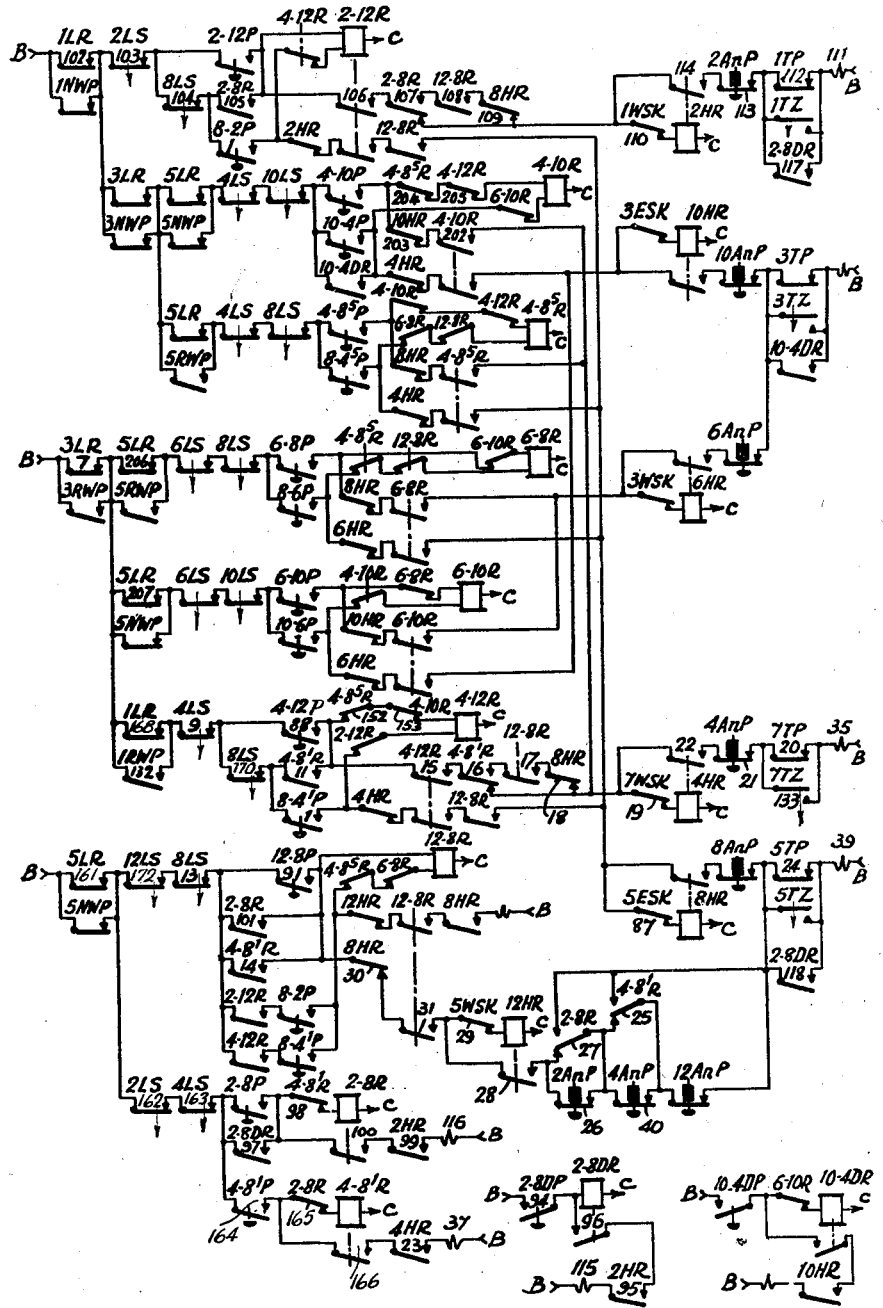
Fig. 5 shows a route circuit network comprising the circuits for the route relays R and the signal control relays HR controlled by the buttons P of Fig. 2.
Figure 9:
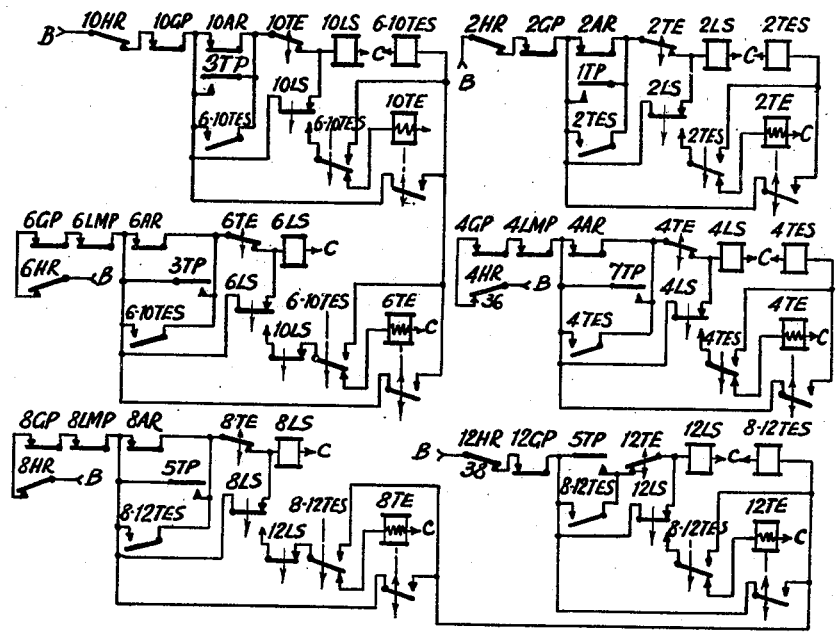
Fig. 9 shows the circuits of the approach locking relays LS and the time element relays TE associated therewith.

It will be noted that the automatic cancellation of the route does not take place, since the contacts 117 and 118 of relay 2—8DR bridge the contacts 112 of relay 1TP and 24 of relay 5TP respectively (Fig. 5).

In case for example one of the track sections comprised in the considered route is defective, certain rules of safety require a different mode of operation for the establishment of the route; according to the invention the track switches included in the defective section are then manually controlled from the desk (Fig. 2) by the buttons NP and RP.

When in the case of the route already described from 4 to 8 via 1 reversed, section 1T is defective, the signalman after checking the condition of the track as prescribed in his regulations and with the object of insuring that it is not occupied, presses in this case button 1AP (Fig. 3) whereby relay 1A (Fig. 11) is energized.

One will remember that the section cancelling buttons disposed in a manner already described, are under seal.

The relay 1A is energized by the following circuit: supply wire B, back contact 119 of relay 2—12R, back contact 120 of relay 4—12R, back contact 121 of relay 1TP, front contact 122 of press button 1AP, winding of relay 1A and return wire C.

The relay 1A is held energized through the same circuit as is used for its energization as far as and including the back contact 121 of relay 1TP and passing then through the fixed resistance 123, front contact 124 of relay 1A, winding of relay 1A and return wire C.

When picking up, the relay 1A completes the circuit of relay 1LR (Fig. 4) by bridging with its front contact 125, the front contact 126 of the dropped relay 1TR.

The track switches 1 being thus unlocked, the signalman presses the individual control button for setting switches 1 to reverse, i. e. 1RP, thus energizing relay 1RWS, (Fig. 13) as described in the French patent previously referred to, which relay is then held energized over its stick circuit and establishes a pick-up circuit for relay 1WR (Fig. 4) including: supply wire B, front contact 127 of relay 1RWS, back contact 42 of relay 4—12R, front contact 43 of relay 1LR, winding of relay 1WR, front contact 44 of relay 1LR, back contact 45 of relay 1B—3NR, back contact 46 of relay 2—12R, back contact 47 of relay 1NWS and return wire C. The control and indication of switches 1 is effected as previously described; section 1RK of the track diagram is illuminated in red by the energization of the red lamp for this section over the following circuit (Fig. 16): Supply wire B, front contact 128 of relay 1RWS, front contact 129 of relay 1RWP, front contact 130 of relay 7TP, back contact 131 of relay 1TP, red lamp R of section 1RK and return wire C. The signalman now presses button 8¹ of entrance 4, whereupon (Fig. 5) the route relay 4—8¹R is energized, causing the same sequence of relay operations with the same consequences as previously described; however, relay 4—12R has in picking up, interrupted at its front contact 120 (Fig. 11) the holding circuit of relay 1A, which accordingly drops; the relay 4—DG controlling the clearing of the signal is however, not energized, its circuit which has already been described being interrupted at the front contact 84 of relay 1TP (Fig. 6).

It will be noticed (Fig. 5) in reference to the pick-up circuits for relays 4—12R and 4HR, the relay 1LR, which is released by the dropping of relay 1A would, by dropping, prevent these two relays from being energized; the front contact 168 of relay 1LR is however, bridged by front contact 132 of the energized relay 1RWP.

Signal 12 will go to "proceed" (relay 12HR energized) and the operation is identical with that described in the previous example; signal 4 however, will not go to "proceed," contact 84 of relay 1TP in the circuit for relay 4DG being open, but it may be passed at "danger" by the issue of a permit at the block station. On the other hand, if the signal involved is one governing movements over a permanent route, the contact of the involved track relay may be bridged by a contact of the relay DR for direct passage; or a call-on indication may be given if the signal is accordingly arranged. It will also be noticed that when a section is defective the direction-responsive relay involved (1ESK) does not drop (Fig. 8), as it is held energized by the back contact 200 of the track relay 1TP of the section. It will be noticed that at this time the corresponding portion of the track diagram will for that reason remain illuminated; for extinguishing its illumination it is only necessary for the signalman to press again on the panel of Fig. 3 the section cancelling button, in the present case button 1AP, which on its part energizes cancelling relay 1A (Fig. 11) which, at its back contact 201, interrupts the holding circuit of the direction-responsive relay IESK (Fig. 8); the signalman then reestablishes the route by operating the press button 8¹ of entrance 4 for causing the cancelling relay IA to drop, and then he cancels the route by operating button 4Anp (Fig. 2).

The invention also relates to arrangements permitting a call-on operation; these arrangements will be described hereinafter considering by way of example, the case in which the route from 4 to 10 has been established and cancelled by a train stopped in a position in which it fouls the circuits 7T and 3T.

In order to give the call-on indication, the signalman proceeds in the following manner; he establishes once more the route from 4 to 10 by pressing button 10 of entrance 4. Relay 4—10R is thereby energized, also relay 4HR, producing the same operations as have already been described except as regards the holding circuit, which is somewhat different, since both the track relay 7TP and the relay 7TZ are dropped; accordingly the circuit will include: supply wire B, resistance 35, back contact 133 of relay 7TZ (Fig. 5), front contact 21 of button 4Anp, front contact 22 of relay 4HR, back contact 19 of relay 7WSK, winding of relay 4HR and return wire C, and, in respect to relay 4—10R, from front contact 22 of relay 4HR to front contact 202 of relay 4—10R, back contact 203 of relay 10HR, back contact 204 of relay 4—8⁵R, back contact 205 of relay 4—12R, winding of relay 4—10R and return wire C. The signalman then presses button 4CP when the train arrives at the signal 4 which stands at "danger"; the relay 4COS is energized through the following circuit (Fig. 14): supply wire B, front contact 134 of press button 4CP, front contact 135 of relay 4GP, back contact 136 of relay 4AR, winding of relay 4COS, and return wire C.

The holding circuit for 4COS includes (Fig. 14): supply wire B, front contact 137 of relay 4HR, front contact 138 of relay 4COS, front contact 135 of relay 4GP, back contact 136 of relay 4AR, winding of relay 4COS and return wire C.

The relay 4COS completes in its picked-up condition the circuit of relay 4LM (Fig. 6) including: supply wire B, front contact 139 of relay 10LS, back contact 140 of relay 10HR, front contact 157 of relay 5WR, back contact 141 of relay 5LR, front contact 142 of relay 5NWP, front contact 143 of relay 5BNR, front contact 158 of relay 3WR, back contact 144 of relay 6—10TES, back contact 145 of relay 3A, back contact 146 of relay 3LR, front contact 147 of relay 3NWP, front contact 148 of relay IB—3NR, front contact 149 of relay INWP, front contact 156 of relay IWR, back contact 79 of relay ILR, back contact 80 of relay 7A, back contact 81 of relay 4TES, front contact 82 of relay 4HR, front contact 150 of relay 5GP, front contact 151 of relay 4COS, winding of relay 4LM, front contact 86 of relay 4HR and return wire C.

Figure 18:
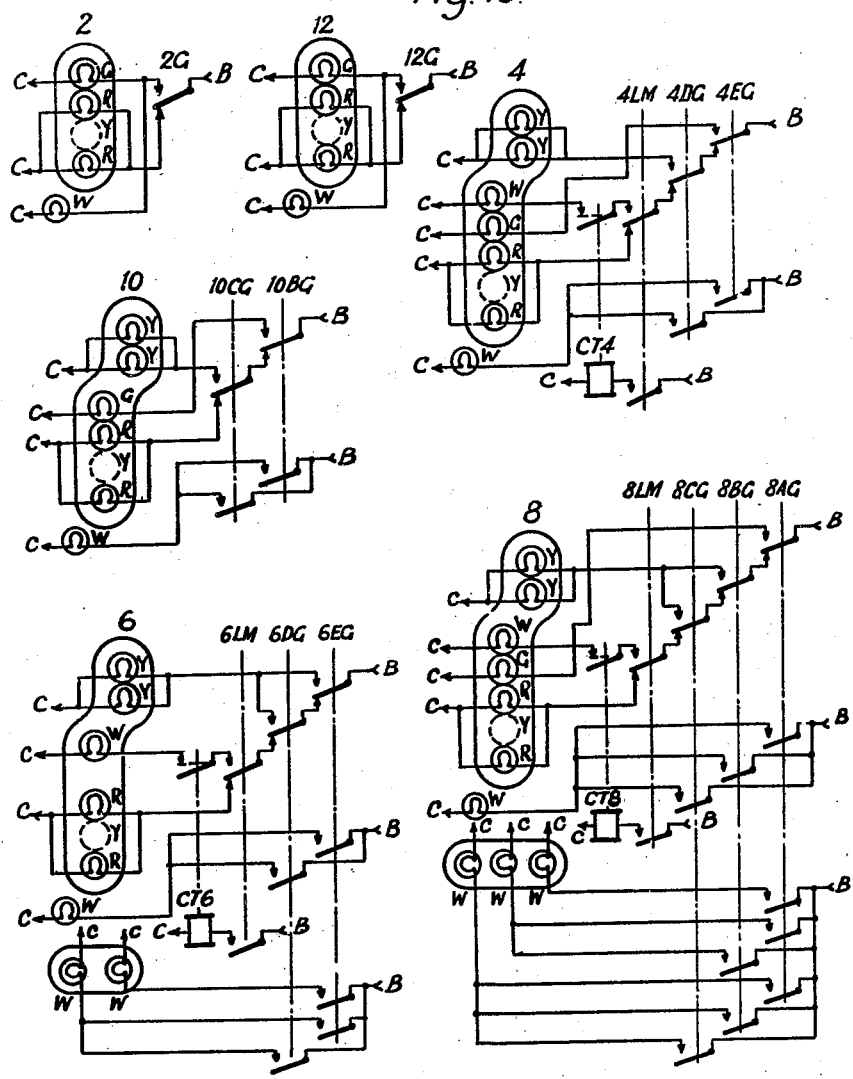
Fig. 18 shows schematically the lighting circuits of the various signals provided along the tracks of Fig. 4.
Figure 19:
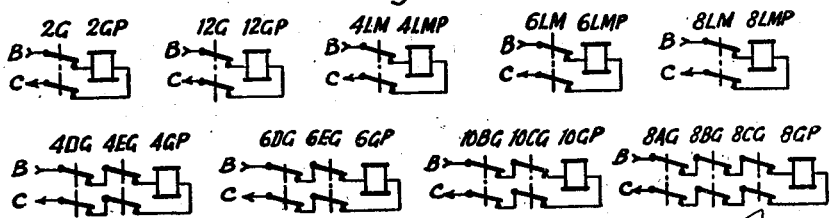
Fig. 19 shows the circuits for the signal indication relays GP and MP.

The energization of relay 4LM causes the call-on indication to be displayed on signal 4 (Fig. 18). Relay 4LMP drops (Fig. 19) and gives the return indication on the track diagram by lighting lamp G of 4K (Fig. 15), which will display a flashing light owing to its being supplied through the contact of the flasher relay CT.

The train then passes signal 4 and when the last axle has cleared the approach section, relay 4AR is reenergized and causes relay 4COS to drop which, on its part, causes relay 4LM (Fig. 6) to drop; the signal will then go to "danger" thus protecting the last train.

It should be noticed that one may provide additional safety arrangements by interposing in the approach section, which is of substantial length, an additional track section adjacent the signal 4, this section which may be of short length will be provided with a protection relay whose contacts are interposed in the holding circuit of relay 4COS. According to a modification of this arrangement a track instrument or its equivalent may be used, arrangements of this type replacing the previously described circuit of relay 4AR.

As a safeguard against faulty operation which would result from simultaneously pressing a number of route buttons associated to the same entrance, an interlocking between the involved route relays is provided according to the invention (Fig. 5).

For example, in the pick-up circuit of relay 4—12R and in its holding circuit back contacts 152 and 153 of relays 4—8⁵R and 4—10R are inserted, which will prevent the energization of relay 4—12R when either of the relays 4—8⁵R or 4—10R are energized by mistake.

This protective system may be used in a small installation; in a more important one it would, however, be cumbersome owing to the great number of contacts involved.

Fig. 5A shows a modified arrangement which obtains this interlocking in a simple manner by giving priority to the energized holding circuits of certain routes diverging from the same entrance.

If, for example, route 4—12 is to be established, the relays 4—8⁵R and 4—10R must be in their released position.

In the circuits of Fig. 5A, the relay 4—10R insures by its contact 154, priority to the route 4—10 relative to the routes 4—8 via 5 reversed and 4—12 via 1 reversed.

It will be noticed that the circuits of the relays 2—8R, 4—8¹R, 2—8DR and 10—4DR, which are identical with those illustrated in and described with reference to Fig. 5, are not shown in Fig. 5A, although their provision would be necessary.

The protection against faulty operation as a result of simultaneously pressing two control buttons for routes which are incompatible by involving different positions of the same track switch, for example by pressing simultaneously the buttons 8—6P and 10—6P, is obtained by including in the signal circuits controlled by the corresponding relays HR (Fig. 6), for example, as illustrated for the relay 8HR or 10HR, a neutral front contact of a relay WR, in this case the contact 157 or 155 of relay 5WR, which interrupts all the circuits for the involved routes.

Relay 5WR is dropped in this case, in which two route buttons have been pressed for routes that are incompatible by involving different positions of the same switch, for the reason that both its terminals are supplied with one and the same polarity, thus rendering energization impossible.

It will also be noticed that additional protection is provided by the relays 5NWP and 5RWP, which cannot be energized simultaneously.

It is thus necessary for the signalman to cancel these two routes "8 to 6" and "10 to 6" before he is able to establish a new route. It will further be noted that if a route button is pressed after the dropping of relay LR, that is to say, about one second after the operation of a conflicting route button, this second operation will be without consequence, since the relay LR interrupts the current supply of the route button, that is, in the case previously referred to, the circuit for the route relays 6—8R or 6—10R is opened at contact 206 or 207 of relay 5LR (Fig. 5).

In Fig. 5B, another arrangement according to the invention is illustrated which permits the route relay provided with two windings to be replaced by an ordinary relay.

The example illustrated relates particularly to the circuits for the route relay 6—8R, but it will be apparent that similar circuits may be provided for any of the press buttons.

Figure 12:
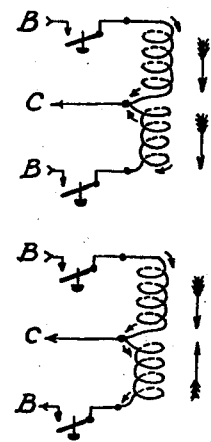
Fig. 12 shows schematically the internal circuits of the double-winding route relays of Fig. 5 or 5A, to illustrate their operation in the case of the common return wires being broken.

Fig. 12 on the one hand, and the description of the supply circuits herein illustrated on the other hand, will show that the normal energization of a relay R, for producing an addition of the fluxes of the two windings in the magnetic circuit (not illustrated) of these relays R, is only possible when the common return circuit towards C is undamaged. When for any reason, accidently or intentionally, the integrity of this common return wire is destroyed, the fluxes due to current in the two windings will be opposite to each other, and the relay cannot be energized. It should be understood that the windings of these relays should be arranged accordingly.

As an alternative, in place of the double-winding relay, the arrangement illustrated in Fig. 5B may be used, which is characterized by the employment of a single-winding route relay R associated with a button having two contacts, the second of which effects the selection of the direction of traffic movement over the route. For example, operation of button 6—8P (Fig. 5B) produces the energization of relay 6—8R through: supply wire B, front contact 7 of relay 3LR, front contact 206 of relay 5LR, front contact 219 of relay 6LS, front contact 211 of relay 8LS, front contact 212 of press button 6—8P, winding of relay 6—8R, and return wire C. The energizing circuit of relay 6HR is the same as the circuit just described as far as the front contact 211 of relay 8LS and then extends over front contact 213 of the press button 6—8P, front contact 214 of relay 6—8P, back contact 215 of relay 8HR, back contact 216 of relay 3WSK, winding of relay 6HR to the return wire C.

The holding circuits of these two relays pass, for relay 6HR, from supply wire B through front contact 217 of relay 3TP, front contact 218 of button 6Anp, front contact 219 of relay 6HR, back contact 216 of relay 3WSK, winding of relay 6HR, and return wire C; for relay 6—8R, from supply wire B through back contact 220 of relay 8HR, front contact 221 of relay 6HR, front contact 222 of relay 6—8R, winding of relay 6—8R and return wire C. Likewise, it is sufficient for establishing a route in the opposite direction to press button 8—6P, whose circuit, being symmetrical to that described above except for the energization of relay 8HR instead of relay 6HR, need not be described in detail.

As regards the operation of the track diagram referred to above it would be of advantage to reduce as much as possible the space required by the illuminating elements while still assuring uniform and intensive illumination, and to facilitate the replacement of the sources of light without necessitating any interference with the wiring proper. With this object in view the invention provides a particularly advantageous arrangement which is illustrated in a section along a vertical plane XX at right angles to the front surface of the track diagram in Fig. 20, and in a corresponding sectional plan view in Fig. 21.

As shown in these figures, lamps of small dimensions are used, which are mounted in a socket the contacts of which are of the type with concentric locking. Furthermore, the single common return connection through the body of the socket has been replaced by individual wire terminals which may be grouped according to circuit conditions. Finally two reflecting surfaces of slight inclination and of a certain length are used owing to which the light rays issuing from the source are successively reflected, which increases the output. This unit is so arranged that all the active parts are accommodated between the panel in front of the socket and an insulating panel parallel thereto, and the connections may be made at the rear of the latter panel.

As shown in the drawings, the lamps 301 and 302 are of the type having a screw base of the kind usually employed in flashlights, that is to say, are of very small dimensions, and are inserted in the base of the reflector which has a quadrangular cross section, and is formed with the reflecting surfaces 303 and 404 carried by the front panel 307 of the track diagram at both sides of the opening 306 of this panel. This opening is covered by a translucent screen 305 extending along the opening 306 of the panel 307. The lamps 301 and 302 or only one of them may be accommodated in colored caps 308 of translucent material which are carried by the reflector 303, 304 in order to insure when necessary illumination of the strip 305 in a different color (for example red).

The lamps and their connections are entirely supported by the insulating panel 310 which extends parallel to the panel 307 and is provided with openings accommodating the fixed sleeves 311; in these sleeves plugs 312 of insulating material may be mounted which are provided at their rear end with a moulded flange 313 and at their front end with a metallic receptacle 314 provided with screw threads corresponding to those of the lamps 301 and 302, and which is in contact with the truncated conical slotted front end of the fixed sleeve 311.

On the rear surface of the panel 310 metallic strips 315 are mounted which form bus-bars which are provided with spaced holes; these holes may accommodate connector plugs 316 which are connected to flexible cable 317 which in turn is connected with the central contact 318 of the removable plug 312. On the opposite surface of the panel 310, that is to say, at its inner surface, conductor elements 319 are secured by means of screws 320 and the portion of these conductor elements which is in contact with the sleeve 311 is recessed with a curvature corresponding to the external shape of this sleeve. Under the nuts of the screws 320 a terminal connector 321 is held through which current is supplied to the fixed sleeve according to the wiring as required, and which constitutes one of the terminals for the energization of the lamp.

It will be seen that the removable plug carrying the lamp may be pulled out to the rear of the insulating panel, after taking out the connector plug 316 from the bus-bar 315 which constitutes the other terminal.

The slots in sleeve 311 are arranged to be compressed to insure holding the removable plug in place with the sleeve in contact with the metal piece 314. It will be seen that current arriving from one of the terminals through the bar 315 is conducted by means of the connector plug 316 and the cable 317 to the central contact pin 318 and to the central contact of the lamp and returns from the latter through parts 314, 311, 319 and 320 to the other terminal 321.

Although we have herein shown and described but one form of apparatus embodying our invention and two modifications thereof, it will be understood that various changes and modifications may be made therein without departing from the spirit and scope of our invention.

Having thus described our invention, what we claim is:

1. In an interlocking control system for a track layout comprising a plurality of track sections interconnected by track switches to form different traffic routes, with signals at the entrances to such routes, a control panel comprising a track diagram adapted to form illuminated representations of the different traffic routes, a control desk associated therewith provided with a group of buttons for each route entrance, each group including a route button for each route diverging from the corresponding entrance, each such button being marked to identify it according to the exit end of the route with which it is associated, route control apparatus responsive to the momentary operation of any one of said buttons alone, to initiate a sequence of operations comprising the automatic operation of the track switches as required to establish the corresponding route, the clearing of the signal at the entrance to such route when established, and the illumination of the portions of said track diagram representing said route; and means controlled automatically by a train passing over said route in response to the clearing of said signal for cancelling said route section by section and for cancelling the illumination of the corresponding sections of the track diagram to indicate the progress of the train over said route.

2. In an interlocking control system for a track layout having a plurality of track switches adapted to be interconnected to form different traffic routes with signals at the entrances to said routes for governing traffic movements in opposite directions, a route relay for each route, a signal control relay for each signal, an individual route button for each direction for each route, a route circuit network including a circuit for each direction for each route relay, each closed in response to the momentary operation of the corresponding route button alone, for successively energizing the route relay for such route and the signal control relay for the signal which governs traffic movements over the route in the corresponding direction, switch control relays controlled by the energized route relay for operating the track switches as required to establish the corresponding route, a circuit controlled by the energized signal control relay closed only when each switch of such route is in the position which the route requires, for clearing the associated signal to permit a traffic movement over the route, and means controlled by a train entering such route for releasing the energized route and signal control relays to cancel the route.

3. In an interlocking control system for a track layout comprising a plurality of track sections interconnected by track switches to form different traffic routes certain of which are arranged end-to-end to form portions of a through route, a control desk provided with a group of route buttons for each route entrance, each group including a button for each route diverging from the corresponding entrance, route control apparatus responsive to the operation of any route button alone to initiate a sequence of operations comprising the automatic operation of the track switches as required to establish the corresponding route or route portion, said apparatus being responsive to the operation of the route button for said through route to establish each portion thereof, and means controlled by a train occupying any section of a route for cancelling the corresponding section only of such route.

4. In an interlocking control system for a track layout comprising a plurality of track sections interconnected by track switches to form different traffic routes certain of which are arranged end-to-end to form portions of a through route, with signals at the entrances to said routes, a route relay for each route including one for said through route and one for each route constituting a portion thereof, a signal control relay for each signal, an individual route button for each route including one for said through route and one for each route constituting a portion thereof, a route circuit network including circuits for each route closed in response to the momentary operation of the corresponding route button alone, for energizing the route relay for such route, a circuit closed by each energized route relay except the one for said through route for energizing the signal control relay for the signal at the entrance to such route, circuits closed by the energized route relay for said through route for successively energizing the route relay and signal control relay for each portion of said through route, switch control relays controlled by each energized route relay except the one for said through route for operating the track switches as required to establish the corresponding route, a circuit controlled by each energized signal control relay closed only when each switch assumes the position required for the route to clear the associated signal, and track controlled means responsive to a train entering the first section of a route for releasing the corresponding route and signal control relays.

5. In an interlocking control system for a track layout comprising a plurality of interconnected track switches adapted to form different traffic routes certain of which are arranged end-to-end to form portions of a through route, a control desk provided with a group of buttons for each route entrance, each group including one or more route buttons and a single cancelling button, there being a route button for each route diverging from the corresponding entrance, route control apparatus responsive to the momentary operation of any route button alone to initiate a sequence of operations comprising the automatic operation of the track switches as required to establish the corresponding route or route portion, said apparatus being responsive to the operation of the route button for said through route to establish each portion thereof, means responsive to the subsequent operation of the cancelling button in a group containing a route button which has been operated for cancelling the corresponding route or route portion, the cancelling button in the group for the entrance to said through route being effective to cancel either the entire through route or its first portion only, dependent upon whether the through route button or the button for said first portion has been operated.

6. In an interlocking control system for a track layout having a plurality of track sections including track switches adapted to be interconnected to form different traffic routes with signals at the entrances to the routes, track relays for the track sections, route relays for selecting the routes, a signal control relay for each signal, push-button controlled pick-up circuits for said route and signal control relays, stick circuits for said route and signal control relays including front contacts of the track relays for opening said circuits automatically to cancel each route when a train enters it, switch control relays controlled by the energized route relays for operating the track switches as required to establish the routes, a signal circuit for each route for controlling the signal at its entrance including front contacts of the associated signal control relay and of the track relay for each section of such route, each such circuit also including contacts controlled by the track switches closed to complete the signal circuit only when each switch of the route occupies the position which the route requires, permanent route relays for one or more of said routes each having a push-button controlled pick-up circuit and a stick circuit including a manually operable contact and a front contact of the signal control relay associated with the corresponding route, and means comprising front contacts of each permanent route relay bridging the track relay contacts in the stick circuits for the route and signal control relays and in the signal circuits as required, to maintain the corresponding route permanently established irrespective of track conditions until such route is manually cancelled.

7. In an interlocking control system for a track layout comprising a plurality of track sections interconnected by track switches to form different traffic routes with signals at the entrances to said routes, rack relays for said sections for indicating the presence of a train in said layout, route buttons for selecting the routes, route control apparatus responsive to the operation of said buttons for establishing selected routes and for clearing the signals at the entrances to said routes subject to traffic conditions as manifested by the track relays for the sections of such routes, means for cancelling each route upon the release of the track relay for the first section thereof by a train entering the route, permanent route relays for certain of the routes having manually controlled pick-up and stick circuits, and means controlled by each permanent route relay when energized with the route with which such relay is associated already established and the signal at its entrance at clear to maintain the route established with such signal at clear irrespective of traffic conditions, until such permanent route relay is released manually.

8. In an interlocking control system, a traffic route through a track layout, a main signal and a call-on signal at the entrance to said route, a signal stick relay having a manually controlled pick-up circuit, a stick circuit for said relay including contacts which open to release the relay when a train enters the route and other contacts which close subsequently to render the circuit available for holding the relay energized if it is picked up while the route is occupied, a signal circuit for clearing the main signal controlled by the signal stick relay and by traffic conditions in said route, a call-on stick relay having a manually controlled pick-up circuit, a stick circuit for said call-on stick relay including a front contact of said signal stick relay and a contact closed only when said main signal is at stop, a circuit for clearing said call-on signal controlled by said call-on stick relay independently of traffic conditions, and auxiliary track controlled means for releasing said call-on stick relay effective if said call-on signal is accepted by a train.

9. In an interlocking control system, a traffic route through a track layout, a main signal and a call-on signal at the entrance to said route, an approach track section adjoining the entrance to said route and having a track relay, a manually controlled signal stick relay for governing said signals, a stick circuit for said stick relay including a track relay contact which opens when a train enters the route and a repeating relay contact which closes subsequently to render the stick circuit again available for holding the relay energized provided it is picked up when the route is occupied, a call-on stick relay, a pick-up circuit for said call-on stick relay including a manually controlled contact, a contact closed only when said main signal is at stop, and a back contact of the track relay for said approach section, a stick circuit for said call-on stick relay including said two last-named contacts and a front contact of said signal stick relay, and a circuit for clearing said call-on signal controlled by said call-on stick relay independently of traffic conditions in said route.

10. In an interlocking control system for a track layout comprising a plurality of track sections containing track switches and having the usual track relay for each section and a locking relay for each track switch with operating circuits for each track switch effective to initiate the operation thereof to normal or reverse only when the associated locking relay is energized, and also having a circuit for each locking relay including a front contact of the detector track relay for the section in which the associated track switch is located, together with route selecting apparatus for completing the switch operating circuits as required to operate the track switches to establish different routes; the combination of a manually controllable stick relay for each track section operable only when the associated track relay is deenergized and the route selecting apparatus is not conditioned to establish a route over such section, each stick relay having front contacts bridging the front contacts of the associated track relay in the circuit for the associated locking relay, with individual switch control apparatus for each track switch rendered effective to operate the switch to normal or reverse as required provided the associated locking relay becomes energized in response to the operation of the associated stick relay, and means for releasing such stick relay upon the subsequent operation of said route selecting apparatus to establish a route over the track switch.

11. In combination with a detector track section including a track switch, a track relay for said section, a locking relay controlled by said track relay, a switch control relay for governing the operation of the switch controlled by said locking relay, a stick relay having a pick-up circuit including a manually operable contact and a back contact of said track relay, a circuit for energizing said locking relay when said track relay is deenergized including a front contact of said stick relay, and a stick circuit for said stick relay including its own front contact and a back contact of said track relay.

12. In combination, a track layout including a plurality of track sections containing track switches, manually controllable means for operating the track switches to establish different traffic routes, signals at the entrances to said routes for governing traffic movements in opposite directions, a detector track relay for each section, a section locking relay for each end section of a route, a pick-up circuit for each section locking relay including a front contact of the track relay for the same section and a signal controlled contact closed only when the adjacent signal is at stop, a stick circuit for each section locking relay including its own front contact, said signal controlled contact and a normally open contact, detector locking controlled by the track relay for each section effective when such section is occupied by a train to prevent the operation of the track switch in that section, route locking rendered effective upon the deenergization of the section locking relay for either end section of a route as determined by the position of the track switches to prevent the operation of the track switches in the unoccupied sections of such route, circuit means rendered effective upon the establishment of a traffic route through said layout in a given direction to close the normally open contact in the stick circuit for the section locking relay for the exit end section of such route, and means for maintaining said normally open contact closed until said exit end section has been vacated by a train passing over the route.

13. In a system for manually controlling track switches to establish traffic routes through a track layout involving a plurality of track sections containing track switches and provided with detector locking to prevent the operation of the track switch in any section occupied by a train, with signals for governing traffic movements over the routes and with section locking relays for the end sections of the routes each effective when deenergized to lock the switches in an unoccupied adjacent section of such route, the combination of circuit means effective when an end section is occupied by a train to deenergize the section locking relay for that section even though the adjacent signal has been passed at stop, circuit means for maintaining such relay energized during the occupancy of the corresponding section comprising a stick circuit for said relay including a normally open contact, means for initially closing said contact upon the establishment of a route for which the section containing the section locking relay constitutes the leaving end section, and means for maintaining said contact closed as long as any section of said established route is occupied.

14. In an interlocking control system for a track layout having a plurality of track switches adapted to be interconnected to form different traffic routes with entrance signals at the opposite ends of said routes, a route relay for each route, a signal control relay for each signal, a control desk provided with route buttons arranged in groups, each group being marked to identify a different entrance end and including the buttons for all routes having such entrance end and also including a single cancelling button, with each route button marked to identify the exit end of a different route, circuit means responsive to the momentary operation of any one of said route buttons for first energizing the route relay for the route extending between the route ends by which such button is identified and then energizing the signal control relay for the signal at the entrance end with which the group including the operated button is identified, switch control relays controlled by said energized route relay for operating the track switches as required for such route, locking relays controlled by said signal control relay and effective to lock each track switch of the route when said signal control relay is energized, a signal circuit controlled by said signal control relay closed to clear the signal associated therewith when each switch of the route is locked in the required position, and circuit means responsive to a momentary operation of the cancelling button in the same group as the operated route button for releasing said energized route and signal control relays.

15. In a system for manually controlling track switches to establish traffic routes through a track layout involving a plurality of track sections containing track switches, with signals for governing traffic movements over the routes, said system including a detector track relay for each section which when deenergized locks the track switch in that section, with route buttons for establishing the routes by operating one or more track switches as required and with switch control buttons for operating the track switches individually when required, the combination of an emergency relay for each section manually controllable provided the corresponding track relay is deenergized and no route including such section has been established by the operation of said route buttons, with circuit means controlled by said emergency relay for cancelling the detector locking of the associated track switch which prevents its response to the operation of the corresponding individual control buttons and with means for preventing the clearing of a signal for governing traffic movements over the track switch as long as such emergency relay is energized.

16. In an interlocking control system for a track layout having a plurality of track sections including track switches adapted to be interconnected to form different traffic routes with signals governing traffic movements over said routes in opposite directions, a route relay for each route, two route buttons for each route relay including one for each direction, a signal control relay for each signal, pick-up circuits closed in response to the operation of but one of said buttons for first energizing the associated route relay and then energizing the signal control relay for the signal governing traffic movements in the direction identified by the operated button, holding circuits for maintaining said route and signal control relays energized only until a train enters the first track section of a route, switch control relays controlled by the energized route relay for operating the track switches as required for the corresponding route, and a signal circuit controlled by the energized signal control relay closed to clear the associated signal when all the switches of the route have assumed the positions required for the route.

17. In an interlocking control system for a track layout having a plurality of track sections including track switches adapted to be interconnected to form different traffic routes with signals governing traffic movements over said routes in opposite directions, a double winding route relay for each route, a signal control relay for each signal, a single contact button for each direction for each route effective when operated to complete a pick-up circuit having two branches one of which includes one winding of the route relay for the corresponding route and the other the winding for the signal control relay for the signal governing traffic movements over such route in the corresponding direction, holding circuits for maintaining said route and signal control relays energized only until a train enters the first track section of a route, switch control relays controlled by the energized route relay for operating the track switches as required for the corresponding route, and a signal circuit controlled by the energized signal control relay closed to clear the associated signal when all the switches of the route have assumed the positions required for the route.

18. In an interlocking control system for a track layout having a plurality of track sections including track switches adapted to be interconnected to form different traffic routes with signals governing traffic movements over said routes in opposite directions, a route relay for each route, a signal control relay for each signal, a route button for each direction for each route having two contacts, a pick-up circuit controlled by one contact of each route button for energizing the corresponding route relay, a pick-up circuit controlled by the other contact of each route button and by the energized route relay for energizing the signal control relay for the signal governing traffic movements over such route in the corresponding direction, holding circuits for maintaining said route and signal control relays energized only until a train enters the first track section of a route, switch control relays controlled by the energized route relay for operating the track switches as required for the corresponding route, and a signal circuit controlled by the energized signal control relay closed to clear the associated signal when all the switches of the route have assumed the positions required for the route.

19. In an interlocking control system for a track layout including track switches adapted to be arranged to form different routes, signals at the entrances to said routes, route buttons for selecting the routes, a route stick relay operable in response to the operation of a particular route button, a holding circuit for said stick relay including normally closed manually operable contacts and also including contacts which open automatically to release the relay when a train enters the first track section of the route, circuit means controlled by the energized route relay for operating the track switches as required for the selected route and then clearing the entrance signal for said route subject to traffic conditions in said route, a second stick relay for a particular route having a manually controllable pick-up circuit and a stick circuit controlled by the associated route relay, and means controlled by said second relay for rendering the corresponding route permanent, comprising contacts effective to prevent the release of the associated route relay and other contacts for maintaining the entrance signal for the route at clear irrespective of traffic conditions until said route relay is manually released.

20. In an interlocking control system for a track layout comprising a plurality of track sections, each containing a track switch, a track relay for each section, a locking relay for each switch, a circuit for each locking relay controlled by a front contact of the track relay for the section containing the switch, a control relay for each track switch operable to normal or reverse to govern the operation of the switch to a corresponding position but only when the corresponding locking relay is energized, a control panel provided with a track diagram comprising a miniature representation of the track layout and provided with a lock release button for each track section in a corresponding location, a release relay controlled by each button but operable only when the track relay for the same section is deenergized, and means comprising a front contact of each release relay for bridging the track relay front contact in the circuit for the associated locking relay to permit emergency operation of the track switch.

21. In combination, a track layout comprising a plurality of track sections interconnected by track switches to form different traffic routes, signals at the entrances to said routes, a track diagram comprising a miniature representation of the track layout, a plurality of lamps for selectively lighting portions of said diagram to display illuminated representations of the different traffic routes and for indicating the conditions of the signals, a control desk associated with said diagram provided with a plurality of buttons including a route button for each direction of traffic over each route through said layout, and a cancelling button for each route, route selecting apparatus responsive to the momentary operation of any route button alone for establishing the corresponding traffic route in the selected direction and for clearing the signal at the entrance thereto, and for also controlling the corresponding lamps to visually indicate the condition of such route and signal on the track diagram, said apparatus being responsive to the momentary operation of the cancelling button for any established route for cancelling such route and the indication thereof on the track diagram, and means controlled by a train occupying an established route for cancelling the route but for maintaining the indication on the track diagram irrespective of the operation of said cancelling button to indicate the progress of the train over the route.

22. A control panel for controlling the interlocked track switches and signals of a railway track layout comprising the combination of an illuminated track diagram constituting a miniature representation of the track layout arranged to show the positions of the track switches, the condition of the signals, and the positions of trains using the tracks, with a separate control desk associated with the diagram upon which is mounted a plurality of buttons for governing the track switches and signals to set up different traffic routes through the track layout, there being a route button for each direction for each route, each such button being marked to identify the destination of its route, said buttons being arranged in groups according to the entrances to the routes, a cancelling button being also provided in each group for manually cancelling any route having the corresponding entrance.

23. In combination, a track layout comprising a plurality of track sections interconnected by track switches to form different traffic routes, a track diagram arranged to form a miniature representation of said layout, lamps for illuminating the tracks of said layout, route buttons for operating the track switches to establish different traffic routes through said layout and for lighting selected lamps to indicate the positions of the track switches in the established routes, and an additional button effective when operated, even though no route has been established, for lighting the lamps representing the switch portions of the diagram in order to enable the positions of all the track switches to be ascertained at any time.

24. In an interlocking control system for a track layout having a plurality of track switches adapted to be interconnected to form different traffic routes, a route relay for each route, having two windings associated with opposite directions of traffic movement, an individual route button for each direction for each route, a route circuit network including a pick-up circuit for each direction for each route relay, each closed in response to the momentary operation of the corresponding route button alone, each such circuit including one winding of the route relay and back contacts of the route relays for all conflicting routes having the same entrance, a holding circuit for each route relay for maintaining it energized after the operated route button is released, and switch control relays controlled by the energized route relay for operating the track switches as required for the route.

25. In an interlocking control system for a track layout having a plurality of track switches adapted to be interconnected to form different traffic routes, a route relay for each route, having two windings associated with opposite directions of traffic movement, an individual route button for each direction for each route, a route circuit network including a pick-up circuit for each direction for each route relay, each closed in response to the momentary operation of the corresponding route button alone, each such circuit including one winding of the route relay, a holding circuit for the energized winding of each route relay including a front contact of the relay, the holding circuits for certain of the route relays for conflicting route having the same entrance also including back contacts of the others so arranged that if a plurality are picked up but one will remain energized to give priority to a particular route, and switch control relays controlled by the energized route relay for operating the track switch as required for the route.

26. In combination with a track layout providing two conflicting routes over a track switch with signals at the entrances to such routes, a route relay for each route having two windings associated with opposite directions of traffic movement, an individual route button for each direction for each route relay for energizing it to establish the corresponding route and for determining which signal is to be cleared when the route is established, a polarized switch control relay for governing the operation of the track switch, a circuit controlled by said route relays for energizing the switch control relay by currents of opposite polarity to operate to one position or the other as required to establish one route or the other but supplying the same polarity to both ends of the circuit in the event the two route relays are both energized, a control circuit for each signal, and means comprising front contacts of said switch control relay in both said control circuits for insuring against the energization of either signal in the event both route relays are energized at the same time.

27. In an interlocking control system, a traffic route through a track layout, track relays for indicating the presence of a train in said route, a main signal and a call-on signal at the entrance to said route, a manually controlled signal control relay, a call-on push button, a call-on stick relay, a protection relay, pick-up and stick circuits for the call-on stick relay including a contact closed in response to the operation of said call-on push button and a front contact of said signal control relay, respectively, both said circuits including a contact of said protection relay and a contact closed only when the main signal is at stop, a circuit for said main signal including contacts controlled by said track relays and closed only when said route is unoccupied and also including a front contact of said signal control relay, a circuit for said call-on signal completed upon the energization of said call-on stick relay but only if all the contacts in the circuit for said main signal are closed except said track relay contacts, and means for operating said protection relay to release the call-on stick relay each time a train governed by the call-on signal enters the route.

28. In an interlocking control system for a track layout having a plurality of track switches adapted to form different traffic routes with signals at the entrances to the routes, route buttons for selecting the routes, route relays controlled by said buttons, a signal control relay and a normally energized locking relay for each signal, circuits for selectively controlling the route and signal control relays in response to the operation of said buttons to select different routes, each such circuit including a front contact of the locking relay for the signal at the entrance end of the selected route, holding circuits for maintaining the route and signal control relays energized after the route buttons are released, means comprising a back contact of each energized signal control relay for releasing the associated locking relay to open the pick-up circuits for the route relays for all routes having the same entrance, switch control relays controlled by the energized route relays for operating the track switches as required to establish the routes, and signal circuits closed to clear the signals at the entrances to the established routes, including front contacts of the corresponding signal control relays.

29. In an interlocking control system for a track layout having a plurality of track switches adapted to form different traffic routes with signals at the entrances to such routes for governing traffic movements in opposite directions, a route relay for each route, a signal control relay for each signal, an individual route button for each direction for each route, a route circuit network including circuits for each route closed in response to the momentary operation of the corresponding route button alone, for successively energizing the route relay for such route and the signal control relay for the signal at the entrance to such route for governing traffic movements in the corresponding direction, switch control relays controlled by the energized route relay for operating the track switches as required to establish the corresponding route, normally energized locking relays effective when released to lock the track switches of the established route in the required positions, circuit means responsive to the energization of said signal control relay for releasing said locking relay, and a signal circuit controlled by the energized signal control relay closed to clear the signal governing traffic movements over said route only when each switch of the route is locked in the position which such route requires.

30. In an interlocking control system for a track layout having a plurality of track switches adapted to form different traffic routes with signals at the entrances to such routes, route buttons for selecting the routes, route relays controlled by said buttons, a signal control relay and a normally energized locking relay for each signal, circuits for selectively controlling the route and signal control relays in response to the operation of said buttons to select different routes, each such circuit including a front contact of the locking relay for the signal at the entrance to the selected route, holding circuits for maintaining the route and signal control relays energized after the route buttons are released, switch control relays controlled by the energized route relays for operating the track switches as required to establish the routes, and signal circuits closed to clear the signals at the entrances to the established routes including front contacts of the corresponding signal control relays, and energizing circuits for each locking relay each including a back contact of the associated signal control relay and a contact closed only when the signal controlled thereby is at stop.

31. In an interlocking control system for a track layout comprising parallel tracks interconnected by track switches to form different traffic routes, with signals at the entrances to said routes, an individual route button for each direction for each route, a route relay for each route responsive to the operation of either one of the associated buttons alone to operate the track switches as required to establish the corresponding route and to also operate the track switches in adjacent parallel tracks to non-conflicting positions to prevent fouling the established route by vehicles moving on such tracks, a signal control relay for each signal, a circuit controlled by the operated route button for energizing the signal control relay for the signal at the entrance to the corresponding route, and a circuit controlled by said signal control relay for clearing said signal when such route is established.

32. In an interlocking control system for a track layout having a plurality of track sections including track switches interconnected to form different traffic routes with signals at the entrances to such routes for governing traffic movements in opposite directions, route buttons for selecting the routes, route relays controlled by said buttons, a signal control relay for each signal, circuits for selectively controlling the route and signal control relays in response to the operation of said buttons to select different routes, holding circuits for maintaining the route and signal control relays for a selected route energized only until a train enters such route, switch control relays controlled by the energized route relays for operating the track switches as required to establish the routes, signal circuits closed to clear the signals at the entrances to the established routes including front contacts of the corresponding signal control relays, a stick relay for each route end, circuit means effective upon the energization of the signal control relay for the signal at the entrance to a selected route for operating the stick relay for the exit end of such route and for maintaining such relay operated until a train moving over such route vacates the last track section thereof, and circuit means effective as long as such stick relay remains in its operated condition for preventing the energization of the signal control relay for the opposing signal at the exit end of such route.

33. In an interlocking control system for a track layout comprising parallel tracks interconnected by track switches to form different traffic routes, with signals at the entrances to such routes, route buttons for selecting the routes, route relays controlled by said buttons, signal control relays for the signals, locking relays for the track switches, route circuits for selectively energizing the route and signal control relays in response to the operation of said buttons to select different routes, switch control relays controlled by the energized route relays for operating the track switches as required to establish the routes and for also operating the track switches in adjacent parallel tracks to non-conflicting positions to prevent fouling an established route by vehicles moving on such tracks, circuits controlled by each signal control relay for the signal at the entrance to a selected route to release the locking relays for the switches of such route and for said switches in adjacent parallel tracks, contacts controlled by said locking relays for locking the switches in the required positions and circuit means for preventing the energization of said route circuits for establishing routes when a track switch in an adjacent track is locked in a conflicting position comprising a front contact of the locking relay for such track switch bridged by a contact controlled by the track switch and closed only when it occupies a non-conflicting position.

GEORGES LOUIS CAILLE.
ALEXANDRE PIERRE LAZE.